United States Patent
Zou et al.

(10) Patent No.: US 12,174,345 B2
(45) Date of Patent: Dec. 24, 2024

(54) OPTICAL LENS ASSEMBLY, IMAGE CAPTURING MODULE, AND MOBILE TERMINAL

(71) Applicant: JIANGXI JINGCHAO OPTICAL CO., LTD., Nanchang (CN)

(72) Inventors: Jinhua Zou, Nanchang (CN); Binbin Liu, Nanchang (CN); Hairong Zou, Nanchang (CN)

(73) Assignee: JIANGXI JINGCHAO OPTICAL CO., LTD., Nanchang (CN)

( * ) Notice: Subject to any disclaimer, the term of this patent is extended or adjusted under 35 U.S.C. 154(b) by 582 days.

(21) Appl. No.: 17/604,739

(22) PCT Filed: Jun. 19, 2019

(86) PCT No.: PCT/CN2019/091801
§ 371 (c)(1),
(2) Date: Oct. 18, 2021

(87) PCT Pub. No.: WO2020/220444
PCT Pub. Date: Nov. 5, 2020

(65) Prior Publication Data
US 2022/0260809 A1    Aug. 18, 2022

(30) Foreign Application Priority Data
Apr. 30, 2019  (CN) .......................... 201910364698.8

(51) Int. Cl.
*G02B 9/34*    (2006.01)
*G02B 13/00*   (2006.01)

(52) U.S. Cl.
CPC ............. *G02B 13/004* (2013.01); *G02B 9/34* (2013.01)

(58) Field of Classification Search
CPC ........ G02B 13/004; G02B 9/34; G02B 13/18; G02B 13/146
See application file for complete search history.

(56) References Cited

U.S. PATENT DOCUMENTS

| 4,981,344 A | 1/1991 | Ueda |
| 6,414,800 B1 | 7/2002 | Hamano |

(Continued)

FOREIGN PATENT DOCUMENTS

| CN | 1206842 A | 2/1999 |
| CN | 1297164 A | 5/2001 |

(Continued)

OTHER PUBLICATIONS

Gross, VCH Verlag GmbH & Co. KGaA, vol. 3, pp. 378-379 (Year: 2007).*

(Continued)

*Primary Examiner* — Marin Pichler
*Assistant Examiner* — Mackenzi Waddell
(74) *Attorney, Agent, or Firm* — Franklin & Associates International Inc; Matthew F. Lambrinos

(57) ABSTRACT

An optical lens assembly, sequentially comprising from an object side to an image side: a first lens; a second lens having positive refractive power, the object side surface of the second lens being concave at the circumference, and the image side surface of the second lens being convex at the circumference; a third lens; and a fourth lens having positive refractive power, the image side surface of the fourth lens being concave at the optical axis, the object side surface and the image side surface of the fourth lens being aspherical, and at least one of the object side surface and the image side surface of the fourth lens having an inflection point. The optical lens assembly satisfies relationship: TT/f<1.3, TT is the distance on the optical axis from the object side surface (Continued)

of the first lens to the image side surface of the fourth lens, and f is effective focal length.

19 Claims, 8 Drawing Sheets

(56) References Cited

U.S. PATENT DOCUMENTS

| | | | |
|---|---|---|---|
| 6,985,309 | B2 | 1/2006 | Shinohara |
| 9,057,868 | B1 | 6/2015 | Chung et al. |
| 2004/0218285 | A1 | 11/2004 | Amanai |
| 2004/0264003 | A1 | 12/2004 | Noda |
| 2005/0046970 | A1 | 3/2005 | Amanai |
| 2007/0070525 | A1* | 3/2007 | Taniyama ............... G02B 9/34 |
| | | | 359/771 |
| 2008/0106801 | A1 | 5/2008 | Kang et al. |
| 2010/0254029 | A1 | 10/2010 | Shinohara |
| 2012/0075718 | A1 | 3/2012 | Seo |
| 2014/0063620 | A1 | 3/2014 | Jung et al. |
| 2014/0184880 | A1* | 7/2014 | Ahn .................... G02B 13/008 |
| | | | 348/335 |
| 2015/0138425 | A1 | 5/2015 | Lee et al. |
| 2016/0124192 | A1 | 5/2016 | Koreeda |
| 2016/0161709 | A1 | 6/2016 | Hsueh et al. |
| 2017/0017060 | A1* | 1/2017 | Liu ..................... G02B 9/34 |
| 2017/0307858 | A1 | 10/2017 | Chen |
| 2018/0113282 | A1 | 4/2018 | Tsai |
| 2020/0073092 | A1 | 3/2020 | Chen |
| 2020/0209551 | A1* | 7/2020 | Chen ..................... G02B 3/04 |

FOREIGN PATENT DOCUMENTS

| | | |
|---|---|---|
| CN | 101093274 A | 12/2007 |
| CN | 101983348 A | 3/2011 |
| CN | 102132189 A | 7/2011 |
| CN | 102419470 A | 4/2012 |
| CN | 102466864 A | 5/2012 |
| CN | 202522758 U | 11/2012 |
| CN | 102914851 A | 2/2013 |
| CN | 102985865 A | 3/2013 |
| CN | 102998774 A | 3/2013 |
| CN | 103676088 A | 3/2014 |
| CN | 103852858 A | 6/2014 |
| CN | 103969804 A | 8/2014 |
| CN | 104570277 A | 4/2015 |
| CN | 104570295 A | 4/2015 |
| CN | 104914558 A | 9/2015 |
| CN | 104932086 A | 9/2015 |
| CN | 204631345 U | 9/2015 |
| CN | 105259636 A | 1/2016 |
| CN | 105372793 A | 3/2016 |
| CN | 105607232 A | 5/2016 |
| CN | 105607233 A | 5/2016 |
| CN | 205210492 U | 5/2016 |
| CN | 205210493 U | 5/2016 |
| CN | 105988185 A | 10/2016 |
| CN | 105988186 A | 10/2016 |
| CN | 106033141 A | 10/2016 |
| CN | 106154496 A | 11/2016 |
| CN | 106338815 A | 1/2017 |
| CN | 106526796 A | 3/2017 |
| CN | 206074890 U | 4/2017 |
| CN | 106610518 A | 5/2017 |
| CN | 106646825 A | 5/2017 |
| CN | 106772931 A | 5/2017 |
| CN | 106773008 A | 5/2017 |
| CN | 106802469 A | 6/2017 |
| CN | 106842512 A | 6/2017 |
| CN | 106842514 A | 6/2017 |
| CN | 106896474 A | 6/2017 |
| CN | 106959500 A | 7/2017 |
| CN | 106970464 A | 7/2017 |
| CN | 107024756 A | 8/2017 |
| CN | 107102425 A | 8/2017 |
| CN | 107167897 A | 9/2017 |
| CN | 107167902 A | 9/2017 |
| CN | 206460205 U | 9/2017 |
| CN | 107290843 A | 10/2017 |
| CN | 206946078 U | 1/2018 |
| CN | 107703609 A | 2/2018 |
| CN | 107831588 A | 3/2018 |
| CN | 207164341 U | 3/2018 |
| CN | 107976770 A | 5/2018 |
| CN | 108089278 A | 5/2018 |
| CN | 108089317 A | 5/2018 |
| CN | 207424362 U | 5/2018 |
| CN | 207424363 U | 5/2018 |
| CN | 108107548 A | 6/2018 |
| CN | 108227146 A | 6/2018 |
| CN | 207557562 U | 6/2018 |
| CN | 108459394 A | 8/2018 |
| CN | 108761745 A | 11/2018 |
| CN | 108873250 A | 11/2018 |
| CN | 109283665 A | 1/2019 |
| CN | 109375346 A | 2/2019 |
| CN | 208506348 U | 2/2019 |
| CN | 109407267 A | 3/2019 |
| CN | 109725406 A | 5/2019 |
| CN | 109752823 A | 5/2019 |
| CN | 109814234 A | 5/2019 |
| CN | 109814235 A | 5/2019 |
| CN | 208833988 U | 5/2019 |
| CN | 208872939 U | 5/2019 |
| CN | 208888449 U | 5/2019 |
| CN | 109870786 A | 6/2019 |
| CN | 109870788 A | 6/2019 |
| CN | 109917533 A | 6/2019 |
| CN | 110018556 A | 7/2019 |
| CN | 209070186 U | 7/2019 |
| CN | 110109226 A | 8/2019 |
| CN | 110208927 A | 9/2019 |
| CN | 110261997 A | 9/2019 |
| CN | 110398815 A | 11/2019 |
| CN | 110426822 A | 11/2019 |
| CN | 110531500 A | 12/2019 |
| CN | 110568583 A | 12/2019 |
| CN | 110618522 A | 12/2019 |
| CN | 209765129 U | 12/2019 |
| CN | 110646919 A | 1/2020 |
| CN | 110646921 A | 1/2020 |
| CN | 110794555 A | 2/2020 |
| CN | 110879454 A | 3/2020 |
| CN | 111007649 A | 4/2020 |
| CN | 111025600 A | 4/2020 |
| CN | 111308688 A | 6/2020 |
| CN | 111338057 A | 6/2020 |
| CN | 210720853 U | 6/2020 |
| CN | 111399186 A | 7/2020 |
| CN | 211786331 U | 10/2020 |
| JP | 2008268977 A | 11/2008 |
| JP | 2013235242 A | 11/2013 |
| KR | 1020140135909 A | 11/2014 |
| TW | 201350956 A | 12/2013 |
| TW | I625567 B | 6/2018 |
| TW | I640811 B | 11/2018 |
| TW | I655474 B | 4/2019 |
| WO | 2003046633 A2 | 6/2003 |
| WO | 2014162779 A1 | 10/2014 |
| WO | 2015159721 A1 | 10/2015 |
| WO | 2017180362 A1 | 10/2017 |
| WO | 2020073978 A1 | 4/2020 |
| WO | 2020258269 A1 | 12/2020 |
| WO | 2021026869 A1 | 2/2021 |
| WO | 2021072745 A1 | 4/2021 |
| WO | 2021087661 A1 | 5/2021 |
| WO | 2021087669 A1 | 5/2021 |
| WO | 2021102943 A1 | 6/2021 |
| WO | 2021103797 A1 | 6/2021 |
| WO | 2021109127 A1 | 6/2021 |
| WO | 2021138754 A1 | 7/2021 |
| WO | 2021179207 A1 | 9/2021 |
| WO | 2021184164 A1 | 9/2021 |
| WO | 2021184165 A1 | 9/2021 |

(56) References Cited

FOREIGN PATENT DOCUMENTS

| WO | 2021184167 A1 | 9/2021 |
|---|---|---|
| WO | 2021203277 A1 | 10/2021 |
| WO | 2021217504 A1 | 11/2021 |
| WO | 2021217664 A1 | 11/2021 |

OTHER PUBLICATIONS

International Search Report on International Patent Application PCT/CN2020/087819, filed Apr. 29, 2020, in the name of Jiangxi Jingchao Optical Co. Ltd.
U.S. Appl. No. 17/611,162, filed Nov. 14, 2021, in the name of Jiangxi Jingchao Optical Co. Ltd.
International Search Report on International Patent Application PCT/CN2020/103797, filed Jul. 23, 2020, in the name of Ofilm Group Co. Ltd.
U.S. Appl. No. 17/612,556, filed Nov. 18, 2021, in the name of Jiangxi Jingchao Optical Co. Ltd.
International Search Report on International Patent Application PCT/CN2020/079526, filed Mar. 16, 2020, in the name of Jiangxi Jingchao Optical Co. Ltd.
U.S. Appl. No. 17/611,165, filed Nov. 14, 2021, in the name of Jiangxi Jingchao Optical Co. Ltd.
International Search Report dated Nov. 3, 2020 on International Patent Application PCT/CN2020/078814 filed Nov. 26, 2020, in the name of Jiangxi Jingchao Optical Co. Ltd.
U.S. Appl. No. 17/611,569, filed Nov. 16, 2021, in the name of Jiangxi Jingchao Optical Co. Ltd.
International Search Report on International Patent Application PCT/CN2020/083697, filed Apr. 8, 2020, in the name of Jiangxi Jingchao Optical Co. Ltd.
U.S. Appl. No. 17/614,359, filed Nov. 25, 2021, in the name of Jiangxi Jingchao Optical Co. Ltd.
International Search Report on International Patent Application PCT/CN2020/088515, filed Apr. 30, 2020, in the name of Jiangxi Jingchao Optical Co. Ltd.
U.S. Appl. No. 17/614,499, filed Nov. 26, 2021, in the name of OFilm Group Co. Ltd. and Jiangxi Jingchao Optical Co. Ltd.
U.S. Appl. No. 17/536,006, filed date Nov. 27, 2021, in the name of Jiangxi Jingchao Optical Co. Ltd,.
U.S. Appl. No. 17/536,010, filed Nov. 27, 2021, in the name of Jiangxi Jingchao Optical Co. Ltd.
International Search Report dated on Jan. 15, 2020 on International Patent Application PCT/CN2019/110525, filed Jan. 3, 2020, in the name of Jiangxi Jingchao Optical Co. Ltd.
U.S. Appl. No. 17/284,467, filed Apr. 11, 2021, in the name of Jiangxi Jingchao Optical Co. Ltd.
International Search Report on International Patent Application PCT/CN2019/100747, filed Aug. 8, 2019, in the name of Jiangxi Jingchao Optical Co. Ltd.
U.S. Appl. No. 17/601,075, filed Oct. 3, 2021, in the name of Jiangxi Jingchao Optical Co. Ltd.
International Search Report dated Mar. 27, 2019 on International Patent Application PCT/CN2020/072135, filed Jan. 15, 2020, in the name of Jiangxi Jingchao Optical Co. Ltd.
U.S. Appl. No. 17/440,786, filed Sep. 19, 2021, in the name of Jiangxi Jingchao Optical Co. Ltd.
U.S. Appl. No. 17/605,985, filed Oct. 22, 2021, in the name of OFilm Group Co. Ltd. and Jiangxi Jingchao Optical Co. Ltd.
International Search Report on International Patent Application PCT/CN2019/115349, filed Dec. 4, 2019, in the name of Jiangxi Jingchao Optical Co. Ltd.
U.S. Appl. No. 17/606,005, filed Oct. 22, 2021, in the name of Jiangxi Jingchao Optical Co. Ltd.
International Search Report dated Apr. 30, 2019 on International Patent Application PCT/CN2019/091801 filed Jun. 19, 2019, in the name of Jiangxi Jingchao Optical Co. Ltd.
U.S. Appl. No. 17/604,739, filed Oct. 18, 2021, in the name of Jiangxi Jingchao Optical Co. Ltd.
International Search Report on International Patent Application PCT/CN2019/122072, filed Nov. 29, 2019, in the name of Jiangxi Jingchao Optical Co. Ltd.
U.S. Appl. No. 17/606,027, filed Oct. 23, 2021, in the name of Jiangxi Jingchao Optical Co. Ltd.
International Search Report on International Patent Application PCT/CN2019/111957, filed Oct. 18, 2019, in the name of Jiangxi Jingchao Optical Co. Ltd.
U.S. Appl. No. 17/606,040, filed Oct. 24, 2021, in the name of Jiangxi Jingchao Optical Co. Ltd.
International Search Report dated Nov. 4, 2019 on International Patent Application PCT/CN2019/115318 filed Jul. 1, 2020, in the name of Jiangxi Jingchao Optical Co. Ltd.
U.S. Appl. No. 17/606,359, filed Oct. 25, 2021, in the name of Jiangxi Jingchao Optical Co. Ltd.
International Search Report on International Patent Application PCT/CN2020/079517, filed Mar. 16, 2020, in the name of Jiangxi Jingchao Optical Co. Ltd.
U.S. Appl. No. 17/609,381, filed Nov. 6, 2021, in the name of Jiangxi Jingchao Optical Co. Ltd.
International Search Report dated Jul. 16, 2020 on International Patent Application PCT/CN2019/123679 filed Aug. 25, 2020, in the name of Jiangxi Jingchao Optical Co. Ltd.
U.S. Appl. No. 17/610,693, filed Nov. 11, 2021, in the name of Jiangxi Jingchao Optical Co. Ltd.
International Search Report on International Patent Application PCT/CN2020/070404, filed Jan. 6, 2020, in the name of Jiangxi Jingchao Optical Co. Ltd.
U.S. Appl. No. 17/440,691, filed Sep. 17, 2021, in the name of Jiangxi Jingchao Optical Co. Ltd.
International Search Report dated Dec. 16, 2020 on International Patent Application PCT/CN2020/079515 filed Dec. 23, 2020, in the name of Jiangxi Jingchao Optical Co. Ltd.
U.S. Appl. No. 17/611,148, filed Nov. 13, 2021, in the name of Jiangxi Jingchao Optical Co. Ltd.

* cited by examiner

OPTICAL LENS ASSEMBLY, IMAGE CAPTURING MODULE, AND MOBILE TERMINAL

CROSS REFERENCE TO RELATED APPLICATION

This application is a national stage application, filed under 35 U.S.C. § 371, of International Patent Application No. PCT/CN2019/091801, filed 19 Jun. 2019, which claims priority to Chinese Patent Application No. 2019103646988, filed on Apr. 30, 2019.

TECHNICAL FIELD

The present disclosure relates to the field of optical imaging, in particular to an optical lens assembly, an image capturing module, and a mobile terminal.

BACKGROUND

With the rapid development of recognition technology (structured light and Time of flight (TOF)), as well as the mass production of photosensitive elements that support the recognition technology, the application fields of the recognition technology will become very extensive, such as face unlocking on mobile phones, automatic drive on cars, human-machine interfaces and games, industrial machine vision and measurement, security monitoring, and the like.

A lens assembly used to collect light, which is indispensable in the recognition technology, is also particularly important. For electronic devices that pursue high screen-to-body ratio and small thickness, how to make the size of the recognition lens assembly smaller to reduce the space occupied by the lens assembly in the electronic device is also a matter of great concern.

SUMMARY

According to various embodiments of the present disclosure, an optical lens assembly, an image capturing module, and a mobile terminal are provided.

An optical lens assembly sequentially includes from an object side to an image side:

a first lens with a refractive power;

a second lens with a positive refractive power, an object side surface of the second lens is concave at a circumference thereof, and an image side surface of the second lens being convex at a circumference thereof;

a third lens with a refractive power;

a fourth lens with a positive refractive power, an image side surface of the fourth lens is concave at an optical axis, an object side surface and the image side surface of the fourth lens are aspherical, and at least one of the object side surface and the image side surface of the fourth lens has an inflection point;

the optical lens assembly satisfies the following relationship:

$TT/f<1.3$;

where, TT is a distance on the optical axis from an object side surface of the first lens to the image side surface of the fourth lens, and f is an effective focal length of the optical lens assembly.

An image capturing module includes a photosensitive element and the optical lens assembly of any one of the above embodiments, the photosensitive element is disposed on an image side of the optical lens assembly.

A mobile terminal includes an emitting module and the image capturing module of the above embodiment. The emitting module is capable of emitting modulated light to a measured object, the modulated light is reflected on a surface of the measured object to form an information light carrying information of the surface of the measured object, and the image capturing module is capable of receiving the information light reflected from the measured object.

The details of one or more embodiments of the present disclosure are set forth in the accompanying drawings and the description below. Other features, objects and advantages of the present disclosure will become apparent from the description, the accompanying drawings, and the claims.

BRIEF DESCRIPTION OF THE DRAWINGS

To better describe and illustrate embodiments and/or examples of the disclosure disclosed herein, reference can be made to one or more accompanying drawings. The additional details or examples used to describe the accompanying drawings should not be construed as limiting the scope of any of the disclosed disclosure, the presently described embodiments and/or examples, and the presently understood preferred mode of the disclosure.

DETAILED DESCRIPTION OF THE EMBODIMENTS

In order to facilitate the understanding of the present disclosure, the present disclosure will be described more fully hereinafter with reference to the related accompanying drawings. Preferable embodiments of the present disclosure are presented in the accompanying drawings. However, the present disclosure may be embodied in many different forms and is not limited to the embodiments described herein. Rather, the purpose of providing these embodiments is to make the content of the present disclosure more thorough and comprehensive.

It should be noted that when an element is referred to as being "fixed to" another element, it can be directly fixed to another element or indirectly connected to another element with a mediating element. When an element is considered to be "connected to" another element, it can be directly connected to another element or indirectly connected to another element with a mediating element. The terms "in", "outer", "left"", "right", and the like used herein are for illustrative purposes only and are not intended to be the only embodiments.

The optical lens assembly with miniaturization characteristics provided by the present disclosure can be applied to face unlocking on mobile phones, automatic drive on cars, human-machine interfaces and games, industrial machine vision and measurement, security monitoring, and the like.

Figure 1:
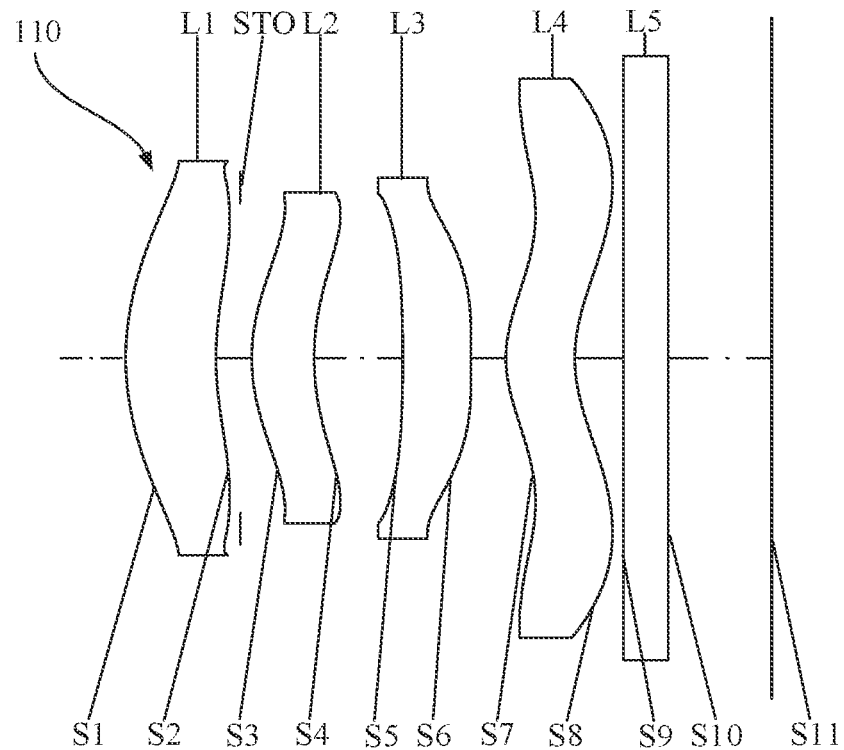
FIG. 1 is a schematic view of an optical lens assembly provided by a first embodiment of the present disclosure.

Referring to FIG. 1, an optical lens assembly 110 in an embodiment of the present disclosure includes, sequentially arranged from an object side to an image side, a first lens L1 with a refractive power, a second lens L2 with a positive refractive power, a third lens L3 with a refractive power, and a fourth lens L4 with a positive refractive power.

The first lens L1 includes an object side surface S1 and an image side surface S2; the second lens L2 includes an object side surface S3 and an image side surface S4; the third lens L3 includes an object side surface S5 and an image side surface S6; and the fourth lens L4 includes an object side surface S7 and an image side surface S8. In addition, the optical lens assembly 110 includes an imaging plane S11 located on the image side of the fourth lens L4. The imaging plane S11 may be a photosensitive surface of a photosensitive element. A light ray carrying information of captured object is imaged on the imaging plane S11 after being adjusted by all the lenses.

The object side surface S3 of the second lens L2 is concave at the circumference thereof, and the image side surface S4 of the second lens L2 is convex at the circumference thereof. The image side surface S8 of the fourth lens L4 is concave at an optical axis, and the object side surface S7 and the image side surface S8 of the fourth lens L4 are both aspherical. At least one of the object side surface S7 and the image side surface S8 of the fourth lens L4 has at least one inflection point, that is, at least one of the object side surface S7 and the image side surface S8 of the fourth lens L4 has an inflection point.

It should be noted that, when describing that a side surface of a lens is convex at the optical axis (a central area of the side surface), it can be understood as that an area of the side surface of the lens near the optical axis is convex, and thus it can also be considered as that the side surface is convex at a paraxial position thereof. When describing that a side surface of a lens is concave at the circumference thereof, it can be understood as that an area of the side surface near the maximum effective radius is concave. For example, when the side surface is convex at the optical axis and also convex at the circumference thereof, the shape of the side surface in a direction from the center (the optical axis) to the edge may be completely convex, or the side surface may be firstly transited from a convex shape at the center to a concave shape, and then become a convex surface at a position close to its maximum effective radius. This is only an example to illustrate the relationship between the optical axis and the circumference. The various shapes and structures (concave-convex relationship) of the side surface are not fully described, but other situations can be derived from the above examples.

In some embodiments, the first lens L1 and the third lens L3 each have positive refractive power, so as to facilitate shortening the total length of the system. In some embodiments, the first lens L1 and the third lens L3 each have negative refractive power, so as to facilitate enlarging the field of view of the system. In some other embodiments, the first lens L1 has a positive refractive power, and the third lens L3 has a negative refractive power, so that the system can achieve a balance between a short total length and a large field of view.

In addition, it should be noted that, the system or optical system described in the present disclosure may be composed of optical elements such as an optical lens assembly 110, a prism, and a filter.

In some embodiments, the first lens L1, the second lens L2, the third lens L3, and the fourth lens L4 are made of plastic. In this case, the plastic lens can reduce the weight of the optical lens assembly 110 and reduce the production cost. In some embodiments, the first lens L1, the second lens L2, the third lens L3, and the fourth lens L4 are made of glass. In this case, the optical lens assembly 110 can withstand higher temperatures and has better optical performance In some other embodiments, it is also can be that only the first lens L1 is made of glass and the other lenses are made of plastic. In this case, the first lens L1, which is closest to the object side, can well withstand the influence of the ambient temperature on the object side, and since the other lenses are made of plastic, the optical lens assembly 110 can also maintain a relatively low production cost. It should be noted that, according to actual requirements, the first lens L1, the second lens L2, the third lens L3, and the fourth lens L4 may be made of any one of plastic or glass, which is not limited here.

In some embodiments, the optical lens assembly 110 is further provided with an optical stop STO therein. In some embodiments, the optical stop STO is arranged on the object side of the first lens L1. In some other embodiments, the optical stop STO may be arranged between the first lens L1 and the fourth lens L4, and specifically may be between the first lens L1 and the second lens L2.

In some embodiments, an infrared band pass filter L5 is arranged at the image side of the fourth lens L4. The infrared band pass filter L5 is arranged between the fourth lens L4 and the imaging plane S11. The infrared band pass filter L5 can allow infrared light at a specific wavelength band to pass through, and block interference light at other wavelength bands, so as to prevent the interference light from being received by the photosensitive element and affecting normal imaging, thereby improving the imaging quality (such as recognition accuracy) of the optical lens assembly 110. It should be noted that, in some other embodiments, the infrared band pass filter L5 is not arranged in the optical lens assembly 110, but is assembled at the image side of the optical lens assembly 110 along with the photosensitive element when the optical lens assembly 110 is assembled with the photosensitive element.

When the optical lens assembly 110 is used to receive infrared light at a specific wavelength, an antireflection film may be arranged on the surface of each lens or on the surface of infrared band pass filter L5 to increase the transmittance of infrared light at the corresponding wavelength.

In some embodiments, the object side surfaces and the image side surfaces of the first lens L1, the second lens L2, the third lens L3, and the fourth lens L4 are aspherical surfaces. The aspherical surface has a surface shape equation as follows:

$$Z = \frac{cr^2}{1+\sqrt{1-(k+1)c^2r^2}} + \sum_i Ai\, r^i$$

Where, Z is a distance from a corresponding point on the aspherical surface to a plane tangent to a vertex of the surface, r is a distance from the corresponding point on the aspherical surface to the optical axis, c is a curvature of the aspherical surface vertex, k is a conic constant, and Ai is a coefficient corresponding to a high-order term of the i-th term in the surface shape equation of the aspherical surface.

In some embodiments, the optical lens assembly 110 satisfies the following relationships:

$TT/f<1.3$;

Where, TT is a distance on the optical axis from the object side surface S1 of the first lens L1 to the image side surface S8 of the fourth lens L4, and f is an effective focal length of the optical lens assembly 110. Specifically, TT/f may be 0.920, 0.930, 0.950, 0.970, 0.990, 1.000, or 1.100. Further, in some embodiments, TT/f≤1.10. When the optical lens assembly 110 satisfies the above relationship, the focal length of the optical lens assembly 110 and a length on the optical axis from the first lens L1 to the fourth lens L4 can be reasonably controlled, so that not only the miniaturization of the optical lens assembly 110 can be achieved, but also the light ray can be better converged on the imaging plane S11.

0.35 mm<T12+T23+T34<0.85 mm;

Where, T12 is an air gap on the optical axis between the first lens L1 and the second lens L2, T23 is an air gap on the optical axis between the second lens L2 and the third lens L3, and T34 is an air gap on the optical axis between the third lens L3 and the fourth lens L4. Specifically, T12+T23+T34 may be 0.430, 0.470, 0.520, 0.570, 0.610, 0.650, 0.680, 0.710, or 0.730, in numerical units of mm. When the configuration of the spacings between adjacent lenses satisfies the above relationship, it will be conducive to the assembly of the lenses and can further shorten the total length of the system. When T12+T23+T34<0.35 mm, space allowance for distributing the spacings between the lenses is too small, so that the sensitivity of the optical system is increased and the assembly of the lenses is not facilitated. When T12+T23+T34≥0.85 mm, it is not conducive to the miniaturization design of the optical lens assembly 110.

1.0<f2/f4<2.5;

Where, f2 is a focal length of the second lens L2, and f4 is a focal length of the fourth lens L4. Specifically, f2/f4 may be 1.20, 1.40, 1.60, 1.80, 1.90, or 2.00. When the above relationship is satisfied, positive refractive powers can be reasonably distributed among the second lens L2 and the fourth lens L4, so as to balance the spherical aberration generated by the third lens L3, reduce the tolerance sensitivity of the system, and improve the imaging quality of the system. When f2/f4≤1.0, the fourth lens L4 needs to provide most of the positive refractive power, which may cause the object side surface S7 of the fourth lens L4 to be excessively curved and poor molded, and thereby affecting the manufacturing yield. When f2/f4≥2.5, the distribution of the refractive powers among the second lens L2 and the fourth lens L4 is unbalanced, resulting in excessive aberration of the optical system that is difficult to be corrected.

$FNO≤1.3$;

Where, FNO is an f-number of the optical lens assembly 110. Specifically, the FNO may be 1.13, 1.17, 1.21, 1.23, 1.25, 1.27, or 1.29. When the above relationship is satisfied, the amount of light passing through the optical lens assembly 110 can be increased, and the optical lens assembly 110 can also obtain clear and detailed information of the measured object in a dark environment or under the condition of insufficient light, thereby improving the imaging quality.

In some embodiments, the optical lens assembly 110 includes an optical stop, and the optical stop STO is arranged at the object side of the first lens L1 or between the first lens L1 to the fourth lens L4, and the optical lens assembly 110 satisfies the following relationships:

$0.8<SL/TTL<1.1$;

Where, SL is a distance on the optical axis from the optical stop STO to the imaging plane S11 of the optical lens assembly 110, and TTL is a distance on the optical axis from the object side surface S1 of the first lens L1 to the imaging plane S11 of the optical lens assembly 110. Specifically, the SL/TTL may be 0.830, 0.850, 0.870, 0.890, 0.910, 0.930, 0.950, or 0.970. When the position of the optical stop STO satisfies the above configuration relationship, the system can achieve a better balance between the characteristics of short total length and large field of view.

$FFL>0.7$ mm;

Where, FFL is a closest distance from the image side surface S8 of the fourth lens L4 to the imaging plane S11 of the optical lens assembly 110 in a direction of the optical axis. Specifically, FFL may be 0.75, 0.78, 0.81, 0.84, 0.87, or 0.90, in numerical units of mm. When the fourth lens L4 satisfies the above relationship, it can be ensured that the optical lens assembly 110 has sufficient focusing space during the installation of the module, thereby improving the assembly yield of the module, and in addition, the depth of focus of the optical lens assembly 110 can be widened to obtain more depth information on the object side.

$R8/R9<1.0$;

Where, R8 is a radius of curvature of the object side surface S7 of the fourth lens L4 at the paraxial position, and R9 is a radius of curvature of the image side surface S8 of the fourth lens L4 at the paraxial position. Specifically, R8/R9 may be 0.680, 0.690, 0.730, 0.760, 0.780, 0.810, 0.830, 0.860, or 0.890. When the above relationship is satisfied, the radiuses of curvature of the object side surface S7 and the image side surface S8 of the fourth lens L4 at the paraxial position can be appropriately configured, thereby increasing the workability of the shape of the fourth lens L4, and in addition, improving the coma of the optical lens assembly 110 and avoiding other aberrations from being too large.

$0.2<R4/f2<0.6$;

Where, R4 is a radius of curvature of the object side surface S3 of the second lens L2 at the paraxial position, and f2 is a focal length of the second lens L2. Specifically, R4/f2 may be 0.240, 0.270, 0.300, 0.330, 0.360, 0.390, 0.420, 0.450, 0.510, or 0.520. When the above relationship is satisfied, the object side surface S3 of the second lens L2 has an appropriate radius of curvature on the optical axis, which is beneficial to correct the aberrations. When R2/f2≤0.2, the positive refractive power provided by the second lens L2 is insufficient, resulting in excessive spherical aberration of the system. When R4/f2≥0.6, the edge of the lens aperture of the second lens L2 will be excessively recurved, resulting in an increase in stray light of the optical lens assembly 110 and affecting the imaging quality.

First Embodiment

Figure 2:
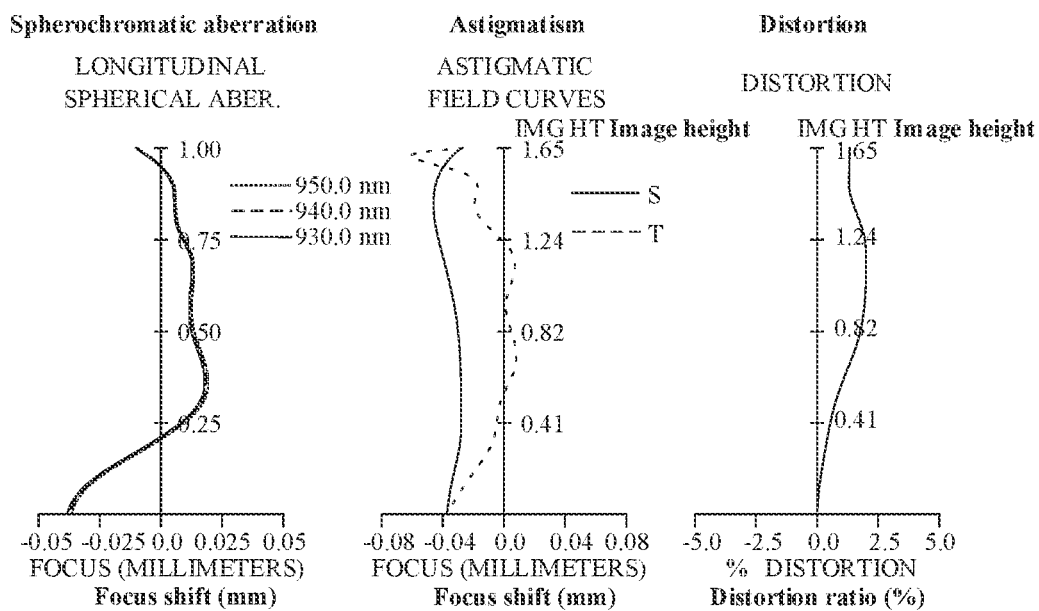
FIG. 2 is a spherochromatic aberration diagram (mm), an astigmatism diagram (mm), and a distortion diagram (%) of the optical lens assembly in the first embodiment.

In the first embodiment as shown FIG. 1, an optical lens assembly 110 includes, sequentially arranged from an object side to an image side, a first lens L1 with a positive refractive power, an optical stop STO, a second lens L2 with a positive refractive power, a third lens L3 with a negative refractive power, and a fourth lens L4 with a positive refractive power. FIG. 2 is a spherochromatic aberration diagram (mm), an astigmatism diagram (mm), and a distortion diagram (%) of the optical lens assembly 110 in the first embodiment, where the astigmatism diagram and the distortion diagram are data diagrams at a reference wavelength.

The object side surface S1 of the first lens L1 is convex at the optical axis, the image side surface S2 of the first lens L1 is concave at the optical axis; the object side surface S1 of the first lens L1 is convex at the circumference thereof, and the image side surface S2 of the first lens L1 is convex at the circumference thereof. The object side surface S3 of the second lens L2 is convex at the optical axis, the image side surface S4 of the second lens L2 is concave at the optical axis; the object side surface S3 of the second lens L2 is concave at the circumference thereof, and the image side surface S4 of the second lens L2 is convex at the circumference thereof. The object side surface S5 of the third lens L3 is concave at the optical axis, the image side surface S6 of the third lens L3 is concave at the optical axis; the object side surface S5 of the third lens L3 is concave at the circumference thereof, and the image side surface S6 of the third lens L3 is concave at the circumference thereof. The object side surface S7 of the fourth lens L4 is convex at the optical axis, the image side surface S8 of the fourth lens L4 is concave at the optical axis; the object side surface S7 of the fourth lens L4 is concave at the circumference thereof, and the image side surface S8 of the fourth lens L4 is convex at the circumference thereof.

The object side surfaces and the image side surfaces of the first lens L1, the second lens L2, the third lens L3, and the fourth lens L4 are aspherical. The aspherical design can solve the problem of distortion of the field of view, and can also enable the lenses to be smaller, thinner, and flatter while achieving good optical effects, thereby enabling the optical lens assembly 110 to have a smaller volume.

The first lens L1, the second lens L2, the third lens L3, and the fourth lens L4 are made of plastic. The plastic lens can reduce the weight of the optical lens assembly 110 and reduce the production cost.

In addition, an infrared band pass filter L5 is further disposed on the image side of the fourth lens L4. The infrared band pass filter L5 can allow infrared light at a specific wavelength band to pass through, and block interference light at other wavelength bands, so as to prevent the interference light from being received by the photosensitive element and affecting normal imaging, thereby improving the imaging quality of the optical lens assembly 110.

The optical lens assembly 110 in the first embodiment satisfies the following relationships:

TT/f=0.998; Where, TT is a distance on the optical axis from the object side surface S1 of the first lens L1 to the image side surface S8 of the fourth lens L4, and f is an effective focal length of the optical lens assembly 110. When the above relationship is satisfied, the effective focal length of the optical lens assembly 110 and the total length on the optical axis between the first lens L1 and the fourth lens L4 can be reasonably controlled, which can not only realize the miniaturization of the optical lens assembly 110, but also ensure that the light ray is better converged on the imaging plane S11.

T12+T23+T34=0.739; Where, T12 is an air gap on the optical axis between the first lens L1 and the second lens L2, T23 is an air gap on the optical axis between the second lens L2 and the third lens L3, and T34 is an air gap on the optical axis between the third lens L3 and the fourth lens L4. When the configuration of the spacings between the lenses satisfies the above relationship, it will be conducive to the assembly of the lenses and can further shorten the total length of the system. When T12+T23+T34≤0.35, space allowance for distributing the spacings between the lenses is too small, so that the sensitivity of the optical system is increased and the assembly of the lenses is not facilitated. When T12+T23+T34≥0.85, it is not conducive to the miniaturization of the optical lens assembly 110.

f2/f4=1.37; Where, f2 is a focal length of the second lens L2, and f4 is a focal length of the fourth lens L4. When the above relationship is satisfied, positive refractive powers can be reasonably distributed among the second lens L2 and the fourth lens L4, so as to balance the spherical aberration generated by the third lens L3, reduce the tolerance sensitivity of the system, and improve the imaging quality of the system. When f2/f4≤1.0, the fourth lens L4 needs to provide most of the positive refractive power, which may cause the object side surface S7 of the fourth lens L4 to be excessively curved and poor molded, and thereby affecting the manufacturing yield. When f2/f4≥2.5, the distribution of the refractive powers among the second lens L2 and the fourth lens L4 is unbalanced, resulting in excessive aberration of the optical system that is difficult to be corrected.

FNO=1.3; Where, FNO is an f-number of the optical lens assembly 110. When the above relationship is satisfied, the amount of light passing through the optical lens assembly 110 can be increased, and the optical lens assembly 110 can also obtain clear and detailed information of the measured object in a dark environment or under the condition of insufficient light, thereby improving the imaging quality.

SL/TTL=0.823; Where, SL is a distance on the optical axis from the optical stop STO to the imaging plane S11, and TTL is a distance on the optical axis from the object side surface S1 of the first lens L1 to the imaging plane S11. When the position of the optical stop STO satisfies the above configuration relationship, the system can achieve a better balance between the characteristics of short total length and large field of view.

FFL=0.74; where FFL is a closest distance from the image side surface S8 of the fourth lens L4 to the imaging plane S11 in the direction of the optical axis, and the unit of FFL is mm. When the fourth lens L4 satisfies the above relationship, it can be ensured that the optical lens assembly 110 has sufficient focusing space during the installation of the module, thereby improving the assembly yield of the module, and in addition, the depth of focus of the optical lens assembly 110 can be widened, so as to obtain more depth information on the object side.

R8/R9=0.821; Where, R8 is a radius of curvature of the object side surface S7 of the fourth lens L4 at the paraxial position, and R9 is a radius of curvature of the image side surface S8 of the fourth lens L4 at the paraxial position. When the above relationship is satisfied, the radiuses of curvature of the object side surface S7 and the image side surface S8 of the fourth lens L4 at the paraxial position can be appropriately configured, thereby increasing the workability of the shape of the fourth lens L4, and in addition, improving the coma of the optical lens assembly 110 and avoiding other aberrations from being too large.

R4/f2=0.233; Where, R4 is a radius of curvature of the object side surface S3 of the second lens L2 at the paraxial position, and f2 is a focal length of the second lens L2. When the above relationship is satisfied, the object side surface S3 of the second lens L2 has an appropriate radius of curvature on the optical axis, which is beneficial to correct the aberrations.

In addition, various parameters of the optical lens assembly 110 are given in Table 1 and Table 2. The elements from the object plane to the imaging plane S11 are arranged in the order of the elements from top to bottom in Table 1. The surface numbers 2 and 3 in Table 1 are the object side surface S1 and the image side surface S2 of the first lens L1, respectively. That is, in one same lens, a surface with a smaller surface number is an object side surface, and a surface with a larger surface number is an image side surface. The Y radius is a radius of curvature of an object side surface or an image side surface of a corresponding surface number at the paraxial position. The first value in the "thickness" parameter column of the first lens L1 is a thickness on the optical axis of the lens, and the second value therein is a distance on the optical axis from the image side surface of the lens to the object side surface of the subsequent lens. The value corresponding to the surface number 11 of the infrared band pass filter L5 in the "thickness" parameter is a distance from the image side surface S10 of the infrared band pass filter L5 to the imaging plane S11. K in Table 2 is a conic constant, and Ai is a coefficient corresponding to a high-order term of the i-th term in the surface shape equation of the aspherical surface.

In addition, the refractive index, Abbe number, and focal length of each lens are values at the reference wavelength. The calculation of the relational expression is based on the lens parameters (such as the data in Table 1) and the surface shape parameters (such as the data in Table 2).

In the first embodiment, the effective focal length of the optical lens assembly 110 is f=2.09 mm, the f-number FNO=1.30, the maximum field of view FOV=75.4 degrees (deg.), and the distance on the optical axis from the object side surface S1 of the first lens L1 to the imaging plane S11 TTL=3.0 mm.

TABLE 1

First Embodiment
f = 2.09 mm, FNO = 1.30, FOV = 75.4 degree, TTL = 3.0 mm

| Surface number | Surface name | Surface type | Y radius (mm) | Thickness (mm) | Material | Refractive index | Abbe number | Focal length (mm) |
|---|---|---|---|---|---|---|---|---|
| 0 | Object plane | Spherical | Infinite | Infinite | | | | |
| 1 | First lens | Aspherical | 1.362 | 0.418 | Plastic | 1.545 | 55.93 | 14.616 |
| 2 | | Aspherical | 1.472 | 0.114 | | | | |
| 3 | Optical stop | Spherical | Infinite | 0.052 | | | | |
| 4 | Second lens | Aspherical | 0.926 | 0.290 | Plastic | 1.661 | 20.373 | 3.971 |
| 5 | | Aspherical | 1.287 | 0.411 | | | | |
| 6 | Third lens | Aspherical | −13.571 | 0.317 | Plastic | 1.545 | 55.93 | −13.458 |
| 7 | | Aspherical | 15.485 | 0.162 | | | | |
| 8 | Fourth lens | Aspherical | 0.627 | 0.320 | Plastic | 1.661 | 20.373 | 2.893 |
| 9 | | Aspherical | 0.764 | 0.225 | | | | |
| 10 | Infrared band pass filter | Spherical | Infinite | 0.210 | Glass | 1.517 | 64.17 | |
| 11 | | Spherical | Infinite | 0.480 | | | | |
| 12 | Imaging plane | Spherical | Infinite | 0.000 | | | | |

Note:
The reference wavelength is 940 nm

TABLE 2

First Embodiment
Aspheric coefficient

| Surface number | 1 | 2 | 4 | 5 | 6 | 7 | 8 | 9 |
|---|---|---|---|---|---|---|---|---|
| K | −0.869 | −13.336 | −0.721 | 0.917 | 29.606 | 29.455 | −4.506 | −1.477 |
| A4 | −0.101 | −0.085 | −0.518 | −0.091 | −0.573 | −2.542 | −0.443 | −0.777 |
| A6 | 0.064 | −1.673 | 1.372 | −0.739 | 4.698 | 10.911 | −0.288 | 0.553 |
| A8 | 0.054 | 9.506 | −11.217 | −0.531 | −27.192 | −34.125 | 1.328 | −0.104 |
| A10 | −0.278 | −28.791 | 42.345 | 0.840 | 90.763 | 71.696 | −1.738 | −0.164 |
| A12 | −0.080 | 48.365 | −89.738 | 4.490 | −179.476 | −96.346 | 1.270 | 0.116 |
| A14 | 0.532 | −42.016 | 102.833 | −10.722 | 194.994 | 76.594 | −0.495 | −0.022 |

TABLE 2-continued

First Embodiment
Aspheric coefficient

| Surface number | 1 | 2 | 4 | 5 | 6 | 7 | 8 | 9 |
|---|---|---|---|---|---|---|---|---|
| A16 | −0.320 | 14.674 | −49.468 | 5.771 | −89.307 | −26.901 | 0.079 | −0.001 |
| A18 | 0.000 | 0.000 | 0.000 | 0.000 | 0.000 | 0.000 | 0.000 | 0.000 |
| A20 | 0.000 | 0.000 | 0.000 | 0.000 | 0.000 | 0.000 | 0.000 | 0.000 |

Second Embodiment

Figure 3:
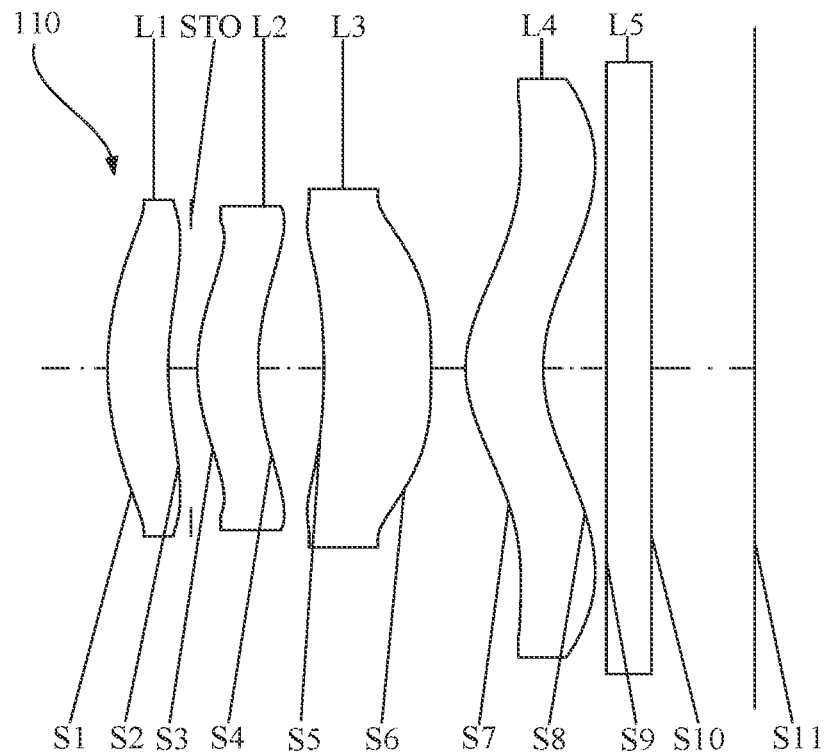
FIG. 3 is a schematic view of an optical lens assembly provided by a second embodiment of the present disclosure.
Figure 4:
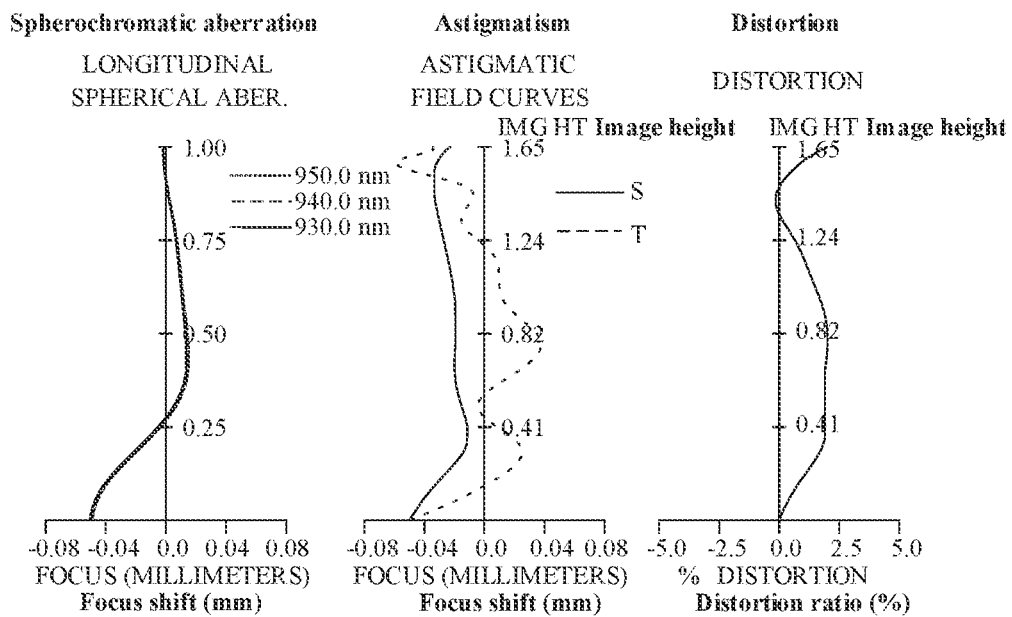
FIG. 4 is a spherochromatic aberration diagram (mm), an astigmatism diagram (mm), and a distortion diagram (%) of the optical lens assembly in the second embodiment.

In the second embodiment as shown FIG. 3, an optical lens assembly 110 sequentially includes, from an object side to an image side, a first lens L1 with a positive refractive power, an optical stop STO, a second lens L2 with a positive refractive power, a third lens L3 with a negative refractive power, and a fourth lens L4 with a positive refractive power. In addition, an infrared band pass filter L5 is further disposed on the image side of the fourth lens L4. FIG. 4 is a spherochromatic aberration diagram (mm), an astigmatism diagram (mm), and a distortion diagram (%) of the optical lens assembly 110 in the second embodiment, where the astigmatism diagram and the distortion diagram are data diagrams at a reference wavelength.

The object side surface S1 of the first lens L1 is convex at the optical axis, the image side surface S2 of the first lens L1 is concave at the optical axis; the object side surface S1 of the first lens L1 is convex at the circumference thereof, and the image side surface S2 of the first lens L1 is convex at the circumference thereof. The object side surface S3 of the second lens L2 is convex at the optical axis, the image side surface S4 of the second lens L2 is concave at the optical axis; the object side surface S3 of the second lens L2 is concave at the circumference thereof, and the image side surface S4 of the second lens L2 is convex at the circumference thereof. The object side surface S5 of the third lens L3 is concave at the optical axis, the image side surface S6 of the third lens L3 is convex at the optical axis; the object side surface S5 of the third lens L3 is convex at the circumference thereof, and the image side surface S6 of the third lens L3 is concave at the circumference thereof. The object side surface S7 of the fourth lens L4 is convex at the optical axis, the image side surface S8 of the fourth lens L4 is concave at the optical axis; the object side surface S7 of the fourth lens L4 is concave at the circumference thereof, and the image side surface S8 of the fourth lens L4 is convex at the circumference thereof.

The object side surfaces and the image side surfaces of the first lens L1, the second lens L2, the third lens L3, and the fourth lens L4 are aspherical surfaces.

The first lens L1, the second lens L2, the third lens L3, and the fourth lens L4 are made of plastic.

In the second embodiment, the effective focal length of the optical lens assembly 110 is f=1.85 mm, the f-number FNO=1.30, the maximum field of view FOV=81.7 degrees (deg.), and the distance on the optical axis from the object side surface S1 of the first lens L1 to the imaging plane S11 TTL=3.0 mm.

The various parameters of the optical lens assembly 110 are given in Table 3 and Table 4, and the definition of each parameter can be obtained from the first embodiment, which will not be repeated here.

TABLE 3

Second Embodiment
f = 1.85 mm, FNO = 1.30, FOV = 81.7 degree, TTL = 3.0 mm

| Surface number | Surface name | Surface type | Y radius (mm) | Thickness (mm) | Material | Refractive index | Abbe number | Focal length (mm) |
|---|---|---|---|---|---|---|---|---|
| 0 | Object plane | Spherical | Infinite | Infinite | | | | |
| 1 | First lens | Aspherical | 1.449 | 0.280 | Plastic | 1.545 | 55.93 | 46.041 |
| 2 | | Aspherical | 1.435 | 0.106 | | | | |
| 3 | Optical stop | Spherical | Infinite | 0.030 | | | | |
| 4 | Second lens | Aspherical | 0.926 | 0.281 | Plastic | 1.661 | 20.373 | 3.784 |
| 5 | | Aspherical | 1.330 | 0.305 | | | | |
| 6 | Third lens | Aspherical | −3.370 | 0.496 | Plastic | 1.545 | 55.93 | −6.836 |
| 7 | | Aspherical | −44.817 | 0.160 | | | | |
| 8 | Fourth lens | Aspherical | 0.581 | 0.360 | Plastic | 1.661 | 20.373 | 1.863 |
| 9 | | Aspherical | 0.868 | 0.293 | | | | |
| 10 | Infrared band pass filter | Spherical | Infinite | 0.210 | Glass | 1.517 | 64.17 | |
| 11 | | Spherical | Infinite | 0.478 | | | | |
| 12 | Imaging plane | Spherical | Infinite | 0.000 | | | | |

Note:
The reference wavelength is 940 nm

TABLE 4

Second Embodiment
Aspheric coefficient

| Surface number | 1 | 2 | 4 | 5 | 6 | 7 | 8 | 9 |
|---|---|---|---|---|---|---|---|---|
| K | −1.373 | −15.789 | −1.046 | 0.978 | −50.000 | 30.000 | −5.206 | −1.190 |
| A4 | −0.160 | −0.218 | −0.575 | −0.065 | −0.427 | −2.573 | 0.294 | −0.228 |
| A6 | 0.426 | −0.679 | 1.377 | −1.502 | 1.363 | 10.497 | −1.661 | −0.653 |
| A8 | −0.405 | 6.303 | −10.233 | 6.536 | −3.604 | −33.511 | 2.928 | 1.330 |
| A10 | −1.293 | −26.734 | 38.429 | −31.593 | −2.177 | 74.843 | −2.862 | −1.190 |
| A12 | 3.850 | 61.064 | −88.551 | 85.898 | 36.475 | −107.981 | 1.614 | 0.551 |
| A14 | −3.877 | −73.838 | 113.650 | −111.807 | −62.324 | 90.959 | −0.483 | −0.124 |
| A16 | 0.745 | 36.447 | −64.756 | 53.767 | 31.483 | −32.945 | 0.059 | 0.010 |
| A18 | 0.000 | 0.000 | 0.000 | 0.000 | 0.000 | 0.000 | 0.000 | 0.000 |
| A20 | 0.000 | 0.000 | 0.000 | 0.000 | 0.000 | 0.000 | 0.000 | 0.000 |

According to the parameter information provided above, the following data can be derived:

| Second Embodiment | |
|---|---|
| f (mm) | 1.85 |
| FNO | 1.30 |
| FOV (degree) | 81.7 |
| TTL (mm) | 3.0 |
| TT/f | 1.091 |
| T12 + T23 + T34 (mm) | 0.601 |
| f2/f4 | 2.03 |
| SL/TTL | 0.871 |
| FFL (mm) | 0.74 |
| R8/R9 | 0.669 |
| R4/f2 | 0.245 |

Third Embodiment

Figure 5:
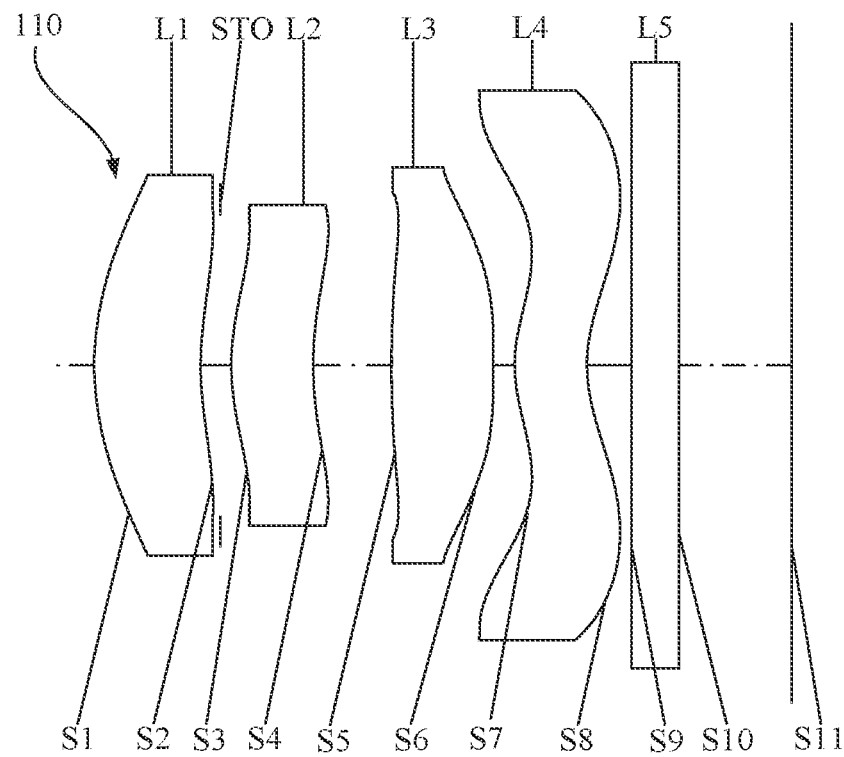
FIG. 5 is a schematic view of an optical lens assembly provided by a third embodiment of the present disclosure.
Figure 6:
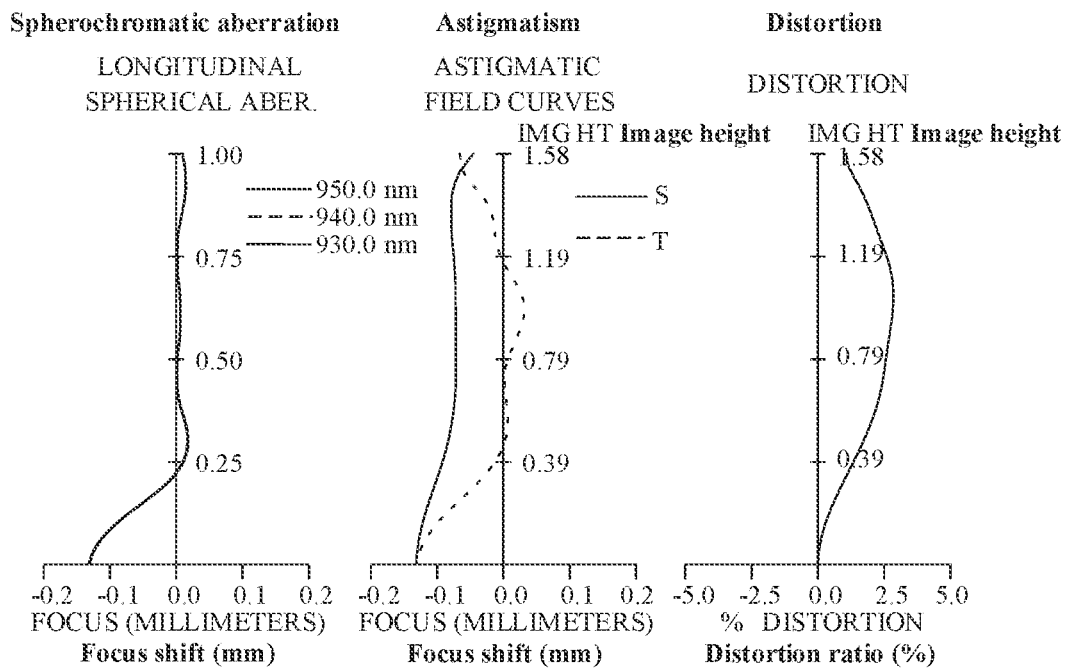
FIG. 6 is a spherochromatic aberration diagram (mm), an astigmatism diagram (mm), and a distortion diagram (%) of the optical lens assembly in the third embodiment.

In the third embodiment as shown FIG. 5, an optical lens assembly 110 sequentially includes, from an object side to an image side, a first lens L1 with a positive refractive power, an optical stop STO, a second lens L2 with a positive refractive power, a third lens L3 with a positive refractive power, and a fourth lens L4 with a positive refractive power. In addition, an infrared band pass filter L5 is further disposed on the image side of the fourth lens L4. FIG. 6 is a spherochromatic aberration diagram (mm), an astigmatism diagram (mm), and a distortion diagram (%) of the optical lens assembly 110 in the third embodiment, where the astigmatism diagram and the distortion diagram are data diagrams at a reference wavelength.

The object side surface S1 of the first lens L1 is convex at the optical axis, the image side surface S2 of the first lens L1 is concave at the optical axis; the object side surface S1 of the first lens L1 is convex at the circumference thereof, and the image side surface S2 of the first lens L1 is convex at the circumference thereof. The object side surface S3 of the second lens L2 is convex at the optical axis, the image side surface S4 of the second lens L2 is concave at the optical axis; the object side surface S3 of the second lens L2 is concave at the circumference thereof, and the image side surface S4 of the second lens L2 is convex at the circumference thereof. The object side surface S5 of the third lens L3 is convex at the optical axis, the image side surface S6 of the third lens L3 is concave at the optical axis; the object side surface S5 of the third lens L3 is concave at the circumference thereof, and the image side surface S6 of the third lens L3 is convex at the circumference thereof. The object side surface S7 of the fourth lens L4 is convex at the optical axis, the image side surface S8 of the fourth lens L4 is concave at the optical axis; the object side surface S7 of the fourth lens L4 is concave at the circumference thereof, and the image side surface S8 of the fourth lens L4 is convex at the circumference thereof.

The object side surfaces and the image side surfaces of the first lens L1, the second lens L2, the third lens L3, and the fourth lens L4 are aspherical surfaces.

The first lens L1, the second lens L2, the third lens L3, and the fourth lens L4 are made of plastic.

In the third embodiment, the effective focal length of the optical lens assembly 110 is f=1.98 mm, the f-number FNO=1.30, the maximum field of view FOV=74 degrees (deg.), and the distance on the optical axis from the object side surface S1 of the first lens L1 to the imaging plane S11 TTL=3.1 mm.

The various parameters of the optical lens assembly 110 are given in Table 5 and Table 6, and the definition of each parameter can be obtained from the first embodiment, which will not be repeated here.

TABLE 5

Third Embodiment
f = 1.98 mm, FNO = 1.30, FOV = 74 degree, TTL = 3.1 mm

| Surface number | Surface name | Surface type | Y radius (mm) | Thickness (mm) | Material | Refractive index | Abbe number | Focal length (mm) |
|---|---|---|---|---|---|---|---|---|
| 0 | Object plane | Spherical | Infinite | Infinite | | | | |
| 1 | First lens | Aspherical | 1.397 | 0.473 | Plastic | 1.545 | 55.93 | 12.060 |
| 2 | | Aspherical | 1.573 | 0.087 | | | | |
| 3 | Optical stop | Spherical | Infinite | 0.050 | | | | |
| 4 | Second lens | Aspherical | 1.167 | 0.364 | Plastic | 1.661 | 20.373 | 4.501 |

TABLE 5-continued

Third Embodiment
f = 1.98 mm, FNO = 1.30, FOV = 74 degree, TTL = 3.1 mm

| Surface number | Surface name | Surface type | Y radius (mm) | Thickness (mm) | Material | Refractive index | Abbe number | Focal length (mm) |
|---|---|---|---|---|---|---|---|---|
| 5 | | Aspherical | 1.736 | 0.348 | | | | |
| 6 | Third lens | Aspherical | 5.609 | 0.453 | Plastic | 1.545 | 55.93 | 18.064 |
| 7 | | Aspherical | 12.978 | 0.094 | | | | |
| 8 | Fourth lens | Aspherical | 0.679 | 0.322 | Plastic | 1.661 | 20.373 | 3.970 |
| 9 | | Aspherical | 0.758 | 0.198 | | | | |
| 10 | Infrared band pass filter | Spherical | Infinite | 0.210 | Glass | 1.517 | 64.17 | |
| 11 | | Spherical | Infinite | 0.502 | | | | |
| 12 | Imaging plane | Spherical | Infinite | 0.000 | | | | |

Note:
The reference wavelength is 940 nm

TABLE 6

Third Embodiment
Aspheric coefficient

| Surface number | 1 | 2 | 4 | 5 | 6 | 7 | 8 | 9 |
|---|---|---|---|---|---|---|---|---|
| K | −0.847 | −12.471 | −0.972 | 0.889 | −5.141 | 97.137 | −5.629 | −1.624 |
| A4 | −0.207 | 0.213 | −0.911 | 0.151 | −0.453 | −2.718 | −1.058 | −0.816 |
| A6 | 1.769 | −11.738 | 8.522 | −7.264 | 8.980 | 13.381 | 1.163 | −0.375 |
| A8 | −12.205 | 131.864 | −110.770 | 69.908 | −80.243 | −45.291 | −0.603 | 4.978 |
| A10 | 50.024 | −844.045 | 866.169 | −430.763 | 420.073 | 102.741 | −2.074 | −12.417 |
| A12 | −125.220 | 3310.068 | −4277.128 | 1650.495 | −1392.237 | −150.796 | 6.155 | 16.913 |
| A14 | 192.617 | −8086.070 | 13399.590 | −3937.746 | 2939.555 | 134.085 | −7.139 | −13.955 |
| A16 | −177.539 | 12013.014 | −25739.691 | 5696.108 | −3832.436 | −61.559 | 4.242 | 6.942 |
| A18 | 89.923 | −9941.335 | 27592.715 | −4577.939 | 2811.542 | 7.411 | −1.274 | −1.919 |
| A20 | −19.259 | 3516.664 | −12620.557 | 1569.663 | −888.347 | 2.458 | 0.152 | 0.227 |

According to the parameter information provided above, the following data can be derived:

| Third Embodiment | |
|---|---|
| f (mm) | 1.98 |
| FNO | 1.30 |
| FOV (degree) | 74 |
| TTL (mm) | 3.1 |
| TT/f | 1.106 |
| T12 + T23 + T34 (mm) | 0.579 |
| f2/f4 | 1.13 |
| SL/TTL | 0.82 |
| FFL (mm) | 0.76 |
| R8/R9 | 0.896 |
| R4/f2 | 0.259 |

Fourth Embodiment

Figure 7:
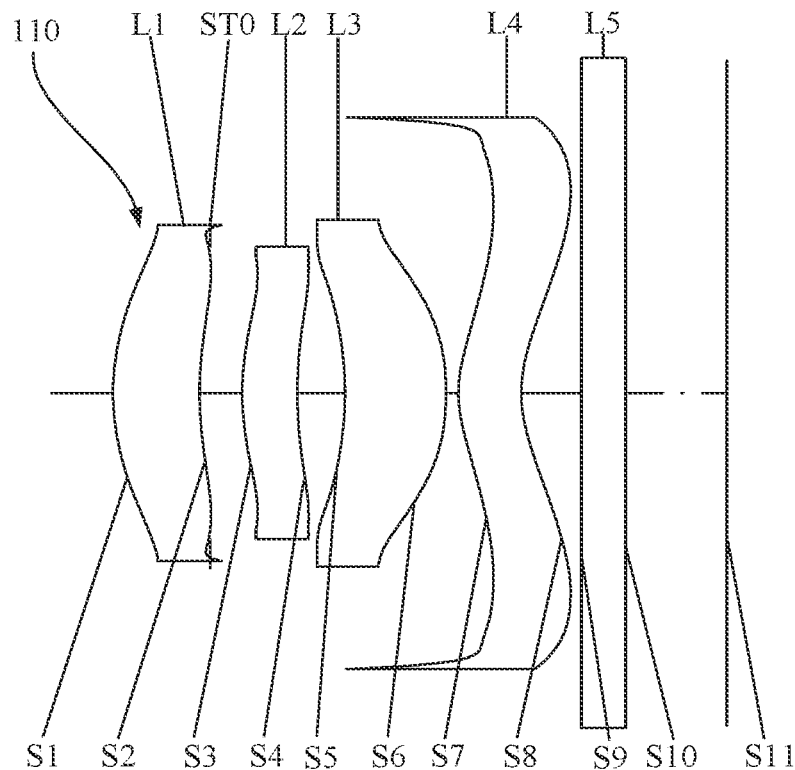
FIG. 7 is a schematic view of an optical lens assembly provided by a fourth embodiment of the present disclosure.
Figure 8:
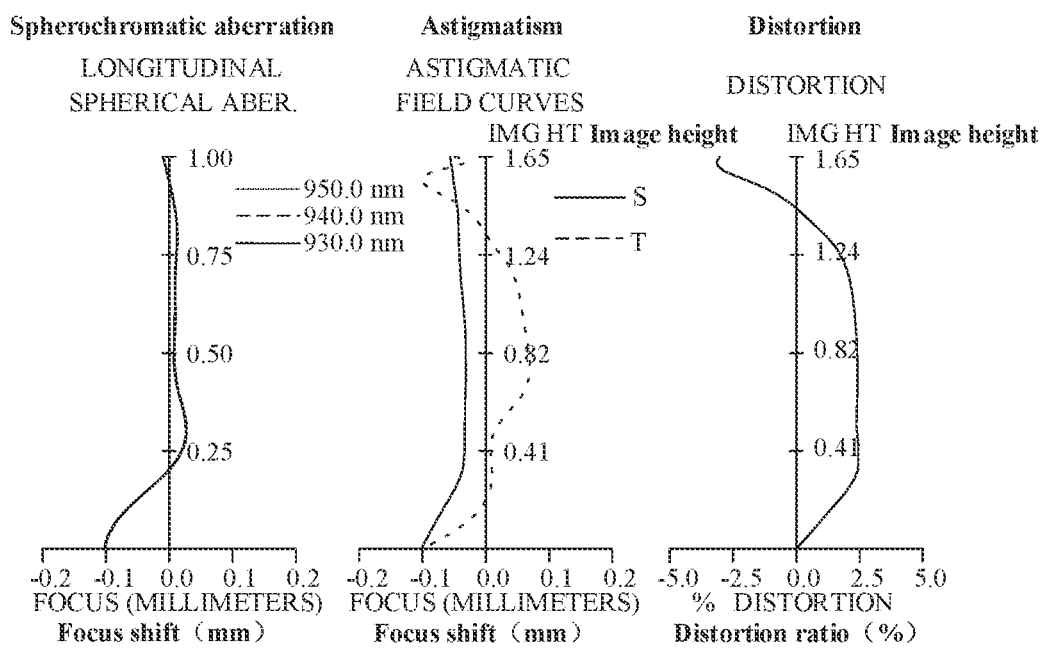
FIG. 8 is a spherochromatic aberration diagram (mm), an astigmatism diagram (mm), and a distortion diagram (%) of the optical lens assembly in the fourth embodiment.

In the fourth embodiment as shown FIG. 7, an optical lens assembly 110 sequentially includes, from an object side to an image side, a first lens L1 with a positive refractive power, an optical stop STO, a second lens L2 with a positive refractive power, a third lens L3 with a negative refractive power, and a fourth lens L4 with a positive refractive power. In addition, an infrared band pass filter L5 is further disposed on the image side of the fourth lens L4. FIG. 8 is a spherochromatic aberration diagram (mm), an astigmatism diagram (mm), and a distortion diagram (%) of the optical lens assembly 110 in the fourth embodiment, where the astigmatism diagram and the distortion diagram are data diagrams at a reference wavelength.

The object side surface S1 of the first lens L1 is convex at the optical axis, the image side surface S2 of the first lens L1 is concave at the optical axis; the object side surface S1 of the first lens L1 is convex at the circumference thereof, and the image side surface S2 of the first lens L1 is convex at the circumference thereof. The object side surface S3 of the second lens L2 is convex at the optical axis, the image side surface S4 of the second lens L2 is concave at the optical axis; the object side surface S3 of the second lens L2 is concave at the circumference thereof, and the image side surface S4 of the second lens L2 is convex at the circumference thereof. The object side surface S5 of the third lens L3 is concave at the optical axis, the image side surface S6 of the third lens L3 is convex at the optical axis; the object side surface S5 of the third lens L3 is concave at the circumference thereof, and the image side surface S6 of the third lens L3 is concave at the circumference thereof. The object side surface S7 of the fourth lens L4 is convex at the optical axis, the image side surface S8 of the fourth lens L4 is concave at the optical axis; the object side surface S7 of the fourth lens L4 is concave at the circumference thereof, and the image side surface S8 of the fourth lens L4 is convex at the circumference thereof.

The object side surfaces and the image side surfaces of the first lens L1, the second lens L2, the third lens L3, and the fourth lens L4 are aspherical surfaces.

The first lens L1, the second lens L2, the third lens L3, and the fourth lens L4 are made of plastic.

In the fourth embodiment, the effective focal length of the optical lens assembly 110 is f=1.8 mm, the f-number FNO=1.20, the maximum field of view FOV=85.3 degrees (deg.), and the distance on the optical axis from the object side surface S1 of the first lens L1 to the imaging plane S11 TTL=2.91 mm.

The various parameters of the optical lens assembly 110 are given in Table 7 and Table 8, and the definition of each parameter can be obtained from the first embodiment, which will not be repeated here.

TABLE 7

Fourth Embodiment
f = 1.8 mm, FNO = 1.20, FOV = 85.3 degree, TTL = 2.91 mm

| Surface number | Surface name | Surface type | Y radius (mm) | Thickness (mm) | Material | Refractive index | Abbe number | Focal length (mm) |
|---|---|---|---|---|---|---|---|---|
| 0 | Object plane | Spherical | Infinite | Infinite | | | | |
| 1 | First lens | Aspherical | 1.247 | 0.410 | Plastic | 1.545 | 55.93 | 5.621 |
| 2 | | Aspherical | 1.885 | 0.050 | | | | |
| 3 | Optical stop | Spherical | Infinite | 0.153 | | | | |
| 4 | Second lens | Aspherical | 1.437 | 0.261 | Plastic | 1.661 | 20.373 | 5.038 |
| 5 | | Aspherical | 2.428 | 0.226 | | | | |
| 6 | Third lens | Aspherical | −1.694 | 0.478 | Plastic | 1.545 | 55.93 | −16.938 |
| 7 | | Aspherical | −2.288 | 0.059 | | | | |
| 8 | Fourth lens | Aspherical | 0.580 | 0.299 | Plastic | 1.639 | 23.261 | 2.810 |
| 9 | | Aspherical | 0.701 | 0.285 | | | | |
| 10 | Infrared band pass filter | Spherical | Infinite | 0.210 | Glass | 1.517 | 64.17 | |
| 11 | | Spherical | Infinite | 0.480 | | | | |
| 12 | Imaging plane | Spherical | Infinite | 0.000 | | | | |

Note:
The reference wavelength is 940 nm

TABLE 8

Fourth Embodiment
Aspheric coefficient

| Surface number | 1 | 2 | 4 | 5 | 6 | 7 | 8 | 9 |
|---|---|---|---|---|---|---|---|---|
| K | −0.723 | −8.741 | 1.418 | 3.452 | 3.548 | 2.795 | −9.230 | −4.087 |
| A4 | −0.327 | 0.125 | −0.378 | 0.310 | 0.383 | −3.987 | −0.489 | −0.351 |
| A6 | 4.380 | −5.673 | 2.709 | −6.055 | −1.279 | 28.828 | 3.026 | 0.839 |
| A8 | −36.763 | 61.932 | −43.381 | 63.115 | 4.501 | −127.390 | −12.646 | −2.280 |
| A10 | 179.159 | −414.250 | 316.653 | −451.576 | −37.854 | 339.133 | 31.065 | 4.361 |
| A12 | −536.470 | 1696.378 | −1425.719 | 2005.537 | 303.620 | −491.076 | −47.050 | −5.327 |
| A14 | 993.484 | −4318.492 | 3978.494 | −5603.435 | −1306.586 | 218.645 | 44.370 | 3.997 |
| A16 | −1109.533 | 6667.155 | −6748.013 | 9527.778 | 2951.481 | 372.184 | −25.300 | −1.767 |
| A18 | 684.256 | −5709.401 | 6454.968 | −8888.124 | −3268.481 | −554.643 | 7.962 | 0.418 |
| A20 | −179.016 | 2078.838 | −2700.074 | 3447.289 | 1390.482 | 219.917 | −1.059 | −0.040 |

According to the parameter information provided above, the following data can be derived:

| Fourth Embodiment | |
|---|---|
| f (mm) | 1.8 |
| FNO | 1.20 |
| FOV (degree) | 85.3 |
| TTL (mm) | 2.91 |
| TT/f | 1.07 |
| T12 + T23 + T34 (mm) | 0.488 |
| f2/f4 | 1.79 |
| SL/TTL | 0.842 |
| FFL (mm) | 0.74 |

| Fourth Embodiment | |
|---|---|
| R8/R9 | 0.827 |
| R4/f2 | 0.285 |

Fifth Embodiment

Figure 9:
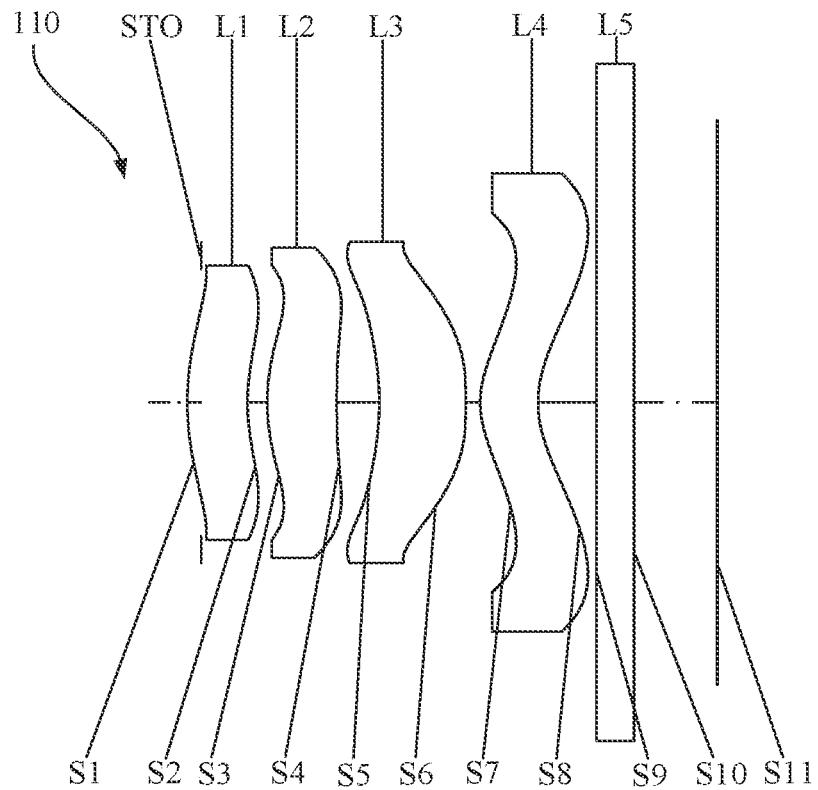
FIG. 9 is a schematic view of an optical lens assembly provided by a fifth embodiment of the present disclosure.
Figure 10:
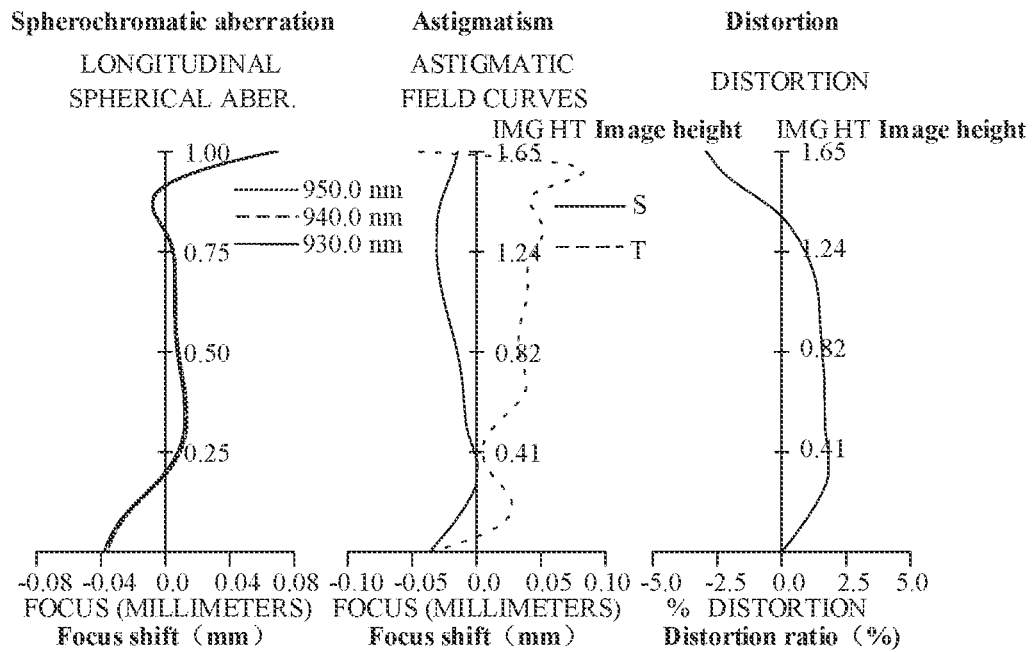
FIG. 10 is a spherochromatic aberration diagram (mm), an astigmatism diagram (mm), and a distortion diagram (%) of the optical lens assembly in the fifth embodiment.

In the fifth embodiment as shown in FIG. 9, an optical lens assembly 110 sequentially includes, from an object side to an image side, an optical stop STO, a first lens L1 with a negative refractive power, a second lens L2 with a positive refractive power, a third lens L3 with a negative refractive power, and a fourth lens L4 with a positive refractive power. In addition, an infrared band pass filter L5 is further disposed on the image side of the fourth lens L4. FIG. 10 is a spherochromatic aberration diagram (mm), an astigmatism diagram (mm), and a distortion diagram (%) of the optical lens assembly 110 in the fifth embodiment, where the astigmatism diagram and the distortion diagram are data diagrams at a reference wavelength.

The object side surface S1 of the first lens L1 is convex at the optical axis, the image side surface S2 of the first lens L1 is concave at the optical axis; the object side surface S1 of the first lens L1 is convex at the circumference thereof, and the image side surface S2 of the first lens L1 is convex at the circumference thereof. The object side surface S3 of the second lens L2 is convex at the optical axis, the image side surface S4 of the second lens L2 is concave at the optical axis; the object side surface S3 of the second lens L2 is concave at the circumference thereof, and the image side surface S4 of the second lens L2 is convex at the circumference thereof. The object side surface S5 of the third lens L3 is concave at the optical axis, the image side surface S6 of the third lens L3 is convex at the optical axis; the object side surface S5 of the third lens L3 is convex at the circumference thereof, and the image side surface S6 of the third lens L3 is concave at the circumference thereof. The object side surface S7 of the fourth lens L4 is convex at the optical axis, the image side surface S8 of the fourth lens L4 is concave at the optical axis; the object side surface S7 of the fourth lens L4 is concave at the circumference thereof, and the image side surface S8 of the fourth lens L4 is convex at the circumference thereof.

The object side surfaces and the image side surfaces of the first lens L1, the second lens L2, the third lens L3, and the fourth lens L4 are aspherical surfaces.

The first lens L1, the second lens L2, the third lens L3, and the fourth lens L4 are made of plastic.

In the fifth embodiment, the effective focal length of the optical lens assembly 110 is f=1.81 mm, the f-number FNO=1.10, the maximum field of view FOV=85.5 degrees (deg.), and the distance on the optical axis from the object side surface S1 of the first lens L1 to the imaging plane S11 TTL=2.99 mm.

The various parameters of the optical lens assembly 110 are given in Table 9 and Table 10, and the definition of each parameter can be obtained from the first embodiment, which will not be repeated here.

TABLE 9

Fifth Embodiment
f = 1.81 mm, FNO = 1.10, FOV = 85.5 degree, TTL = 2.99 mm

| Surface number | Surface name | Surface type | Y radius (mm) | Thickness (mm) | Material | Refractive index | Abbe number | Focal length (mm) |
|---|---|---|---|---|---|---|---|---|
| 0 | Object plane | Spherical | Infinite | 800.000 | | | | |
| 1 | Optical stop | Spherical | Infinite | −0.079 | | | | |
| 2 | First lens | Aspherical | 1.603 | 0.340 | Plastic | 1.535 | 55.779 | −18.010 |
| 3 | | Aspherical | 1.270 | 0.111 | | | | |
| 4 | Second lens | Aspherical | 1.221 | 0.392 | Plastic | 1.661 | 20.373 | 2.328 |
| 5 | | Aspherical | 6.173 | 0.240 | | | | |
| 6 | Third lens | Aspherical | −1.664 | 0.488 | Plastic | 1.535 | 55.779 | −4.862 |
| 7 | | Aspherical | −5.238 | 0.081 | | | | |
| 8 | Fourth lens | Aspherical | 0.532 | 0.327 | Plastic | 1.661 | 20.373 | 2.057 |
| 9 | | Aspherical | 0.685 | 0.331 | | | | |
| 10 | Infrared band pass filter | Spherical | Infinite | 0.210 | Glass | 1.517 | 64.17 | |
| 11 | | Spherical | Infinite | 0.471 | | | | |
| 12 | Imaging plane | Spherical | Infinite | 0.000 | | | | |

Note:
The reference wavelength is 940 nm

TABLE 10

Fifth Embodiment
Aspheric coefficient

| Surface number | 2 | 3 | 4 | 5 | 6 | 7 | 8 | 9 |
|---|---|---|---|---|---|---|---|---|
| K | −15.908 | −21.679 | −22.762 | −99.000 | −13.235 | 11.843 | −5.778 | −1.867 |
| A4 | 0.276 | 0.576 | 1.109 | 0.281 | 0.179 | −3.706 | −0.024 | −0.308 |
| A6 | −1.757 | −6.255 | −6.945 | −1.192 | −2.518 | 22.646 | −0.283 | −1.190 |
| A8 | 6.735 | 32.232 | 27.731 | 6.977 | 14.001 | −97.186 | −2.446 | 5.533 |
| A10 | −9.410 | −132.203 | −81.250 | −38.012 | −45.198 | 287.684 | 14.919 | −11.330 |
| A12 | −44.392 | 375.189 | 120.577 | 99.578 | 77.999 | −577.440 | −37.695 | 13.508 |
| A14 | 241.029 | −690.683 | −14.777 | −141.800 | −68.329 | 766.244 | 52.259 | −9.884 |
| A16 | −491.733 | 787.100 | −208.211 | 112.931 | 25.058 | −639.396 | −41.343 | 4.365 |
| A18 | 478.342 | −505.749 | 266.827 | −46.112 | 1.012 | 302.994 | 17.482 | −1.068 |
| A20 | −183.496 | 140.948 | −107.232 | 7.013 | −2.167 | −62.045 | −3.063 | 0.111 |

According to the parameter information provided above, the following data can be derived:

| Fifth Embodiment | |
|---|---|
| f (mm) | 1.81 |
| FNO | 1.10 |
| FOV (degree) | 85.5 |
| TTL (mm) | 2.99 |
| TT/f | 1.093 |
| T12 +T23 +T34 (mm) | 0.432 |
| f2/f4 | 1.13 |
| SL/TTL | 0.974 |
| FFL (mm) | 0.73 |
| R8/R9 | 0.777 |
| R4/f2 | 0.524 |

Sixth Embodiment

Figure 11:
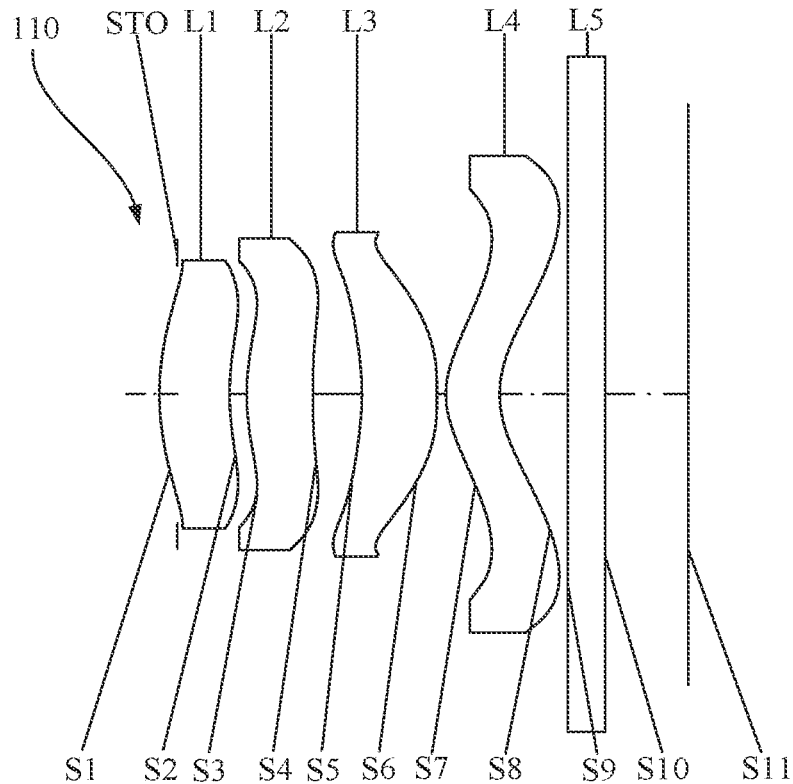
FIG. 11 is a schematic view of an optical lens assembly provided by a sixth embodiment of the present disclosure.
Figure 12:
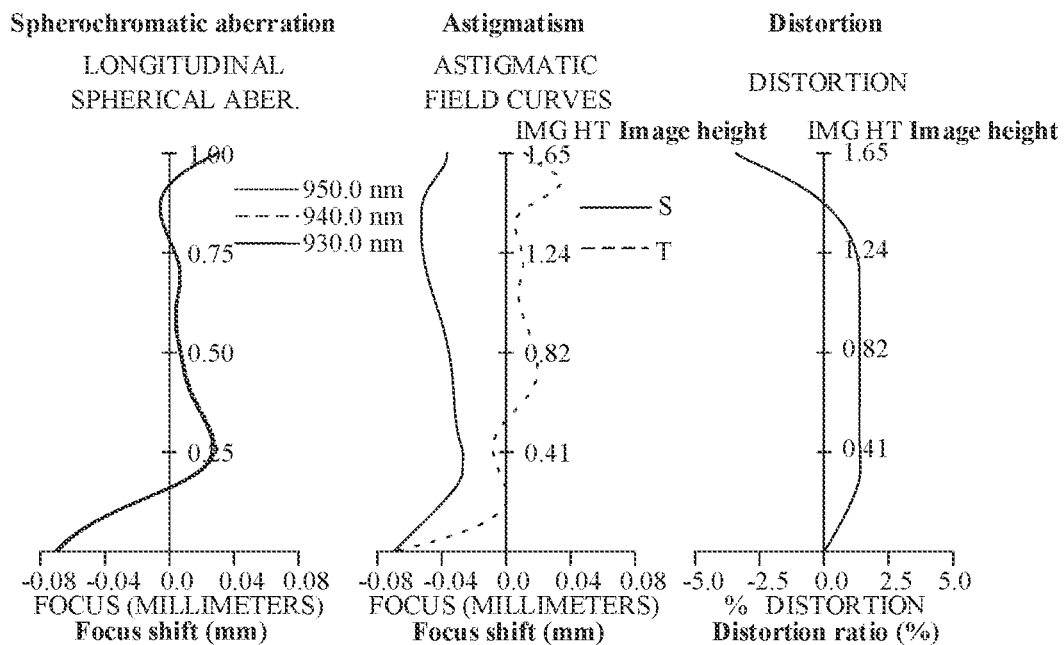
FIG. 12 is a spherochromatic aberration diagram (mm), an astigmatism diagram (mm), and a distortion diagram (%) of the optical lens assembly in the sixth embodiment.

In the sixth embodiment as shown FIG. 11, an optical lens assembly 110 sequentially includes, from an object side to an image side, an optical stop STO, a first lens L1 with a positive refractive power, a second lens L2 with a positive refractive power, a third lens L3 with a negative refractive power, and a fourth lens L4 with a positive refractive power. In addition, an infrared band pass filter L5 is further disposed on the image side of the fourth lens L4. FIG. 12 is a spherochromatic aberration diagram (mm), an astigmatism diagram (mm), and a distortion diagram (%) of the optical lens assembly 110 in the sixth embodiment, where the astigmatism diagram and the distortion diagram are data diagrams at a reference wavelength.

The object side surface S1 of the first lens L1 is convex at the optical axis, the image side surface S2 of the first lens L1 is concave at the optical axis; the object side surface S1 of the first lens L1 is convex at the circumference thereof, and the image side surface S2 of the first lens L1 is convex at the circumference thereof. The object side surface S3 of the second lens L2 is convex at the optical axis, the image side surface S4 of the second lens L2 is concave at the optical axis; the object side surface S3 of the second lens L2 is concave at the circumference thereof, and the image side surface S4 of the second lens L2 is convex at the circumference thereof. The object side surface S5 of the third lens L3 is concave at the optical axis, the image side surface S6 of the third lens L3 is convex at the optical axis; the object side surface S5 of the third lens L3 is convex at the circumference thereof, and the image side surface S6 of the third lens L3 is concave at the circumference thereof. The object side surface S7 of the fourth lens L4 is convex at the optical axis, the image side surface S8 of the fourth lens L4 is concave at the optical axis; the object side surface S7 of the fourth lens L4 is concave at the circumference thereof, and the image side surface S8 of the fourth lens L4 is convex at the circumference thereof.

The object side surfaces and the image side surfaces of the first lens L1, the second lens L2, the third lens L3, and the fourth lens L4 are aspherical surfaces.

The first lens L1, the second lens L2, the third lens L3, and the fourth lens L4 are made of plastic.

In the sixth embodiment, the effective focal length of the optical lens assembly 110 is f=1.81 mm, the f-number FNO=1.18, the maximum field of view FOV=85.5 degrees (deg.), and the distance on the optical axis from the object side surface S1 of the first lens L1 to the imaging plane S11 TTL=2.99 mm.

The various parameters of the optical lens assembly 110 are given in Table 11 and Table 12, and the definition of each parameter can be obtained from the first embodiment, which will not be repeated here.

TABLE 11

Sixth Embodiment
f = 1.81 mm, FNO = 1.18, FOV = 85.5 degree, TTL = 2.99 mm

| Surface number | Surface name | Surface type | Y radius (mm) | Thickness (mm) | Material | Refractive index | Abbe number | Focal length (mm) |
|---|---|---|---|---|---|---|---|---|
| 0 | Object plane | Spherical | Infinite | 800.000 | | | | |
| 1 | Optical stop | Spherical | Infinite | −0.101 | | | | |
| 2 | First lens | Aspherical | 1.602 | 0.397 | Plastic | 1.545 | 55.93 | 30.795 |
| 3 | | Aspherical | 1.621 | 0.097 | | | | |
| 4 | Second lens | Aspherical | 1.496 | 0.372 | Plastic | 1.661 | 20.373 | 3.436 |
| 5 | | Aspherical | 4.316 | 0.278 | | | | |
| 6 | Third lens | Aspherical | −1.682 | 0.425 | Plastic | 1.545 | 55.93 | −5.041 |
| 7 | | Aspherical | −4.855 | 0.050 | | | | |
| 8 | Fourth lens | Aspherical | 0.490 | 0.305 | Plastic | 1.661 | 20.373 | 1.853 |
| 9 | | Aspherical | 0.638 | 0.386 | | | | |
| 10 | Infrared band pass filter | Spherical | Infinite | 0.210 | Glass | 1.517 | 64.17 | |
| 11 | | Spherical | Infinite | 0.471 | | | | |
| 12 | Imaging plane | Spherical | Infinite | 0.000 | | | | |

Note:
The reference wavelength is 940 nm

TABLE 12

Sixth Embodiment
Aspheric coefficient

| Surface number | 2 | 3 | 4 | 5 | 6 | 7 | 8 | 9 |
|---|---|---|---|---|---|---|---|---|
| K | −11.162 | −26.177 | −65.223 | −98.372 | −24.099 | 10.426 | −5.267 | −1.850 |
| A4 | −0.028 | 0.546 | 1.824 | 0.350 | 0.162 | −4.088 | −0.014 | −0.267 |
| A6 | 4.752 | −7.506 | −18.347 | −1.854 | −1.678 | 26.899 | 0.812 | −0.785 |
| A8 | −58.411 | 51.670 | 120.346 | 8.841 | 6.985 | −119.535 | −6.994 | 3.269 |
| A10 | 378.488 | −266.559 | −576.356 | −45.027 | −14.291 | 358.076 | 22.240 | −5.993 |
| A12 | −1476.747 | 903.553 | 1837.238 | 131.626 | −0.271 | −717.494 | −39.412 | 6.465 |
| A14 | 3552.420 | −1954.539 | −3819.294 | −222.010 | 49.701 | 942.391 | 41.840 | −4.338 |
| A16 | −5155.460 | 2609.499 | 4998.524 | 217.707 | −81.629 | −775.423 | −26.348 | 1.786 |
| A18 | 4137.505 | −1962.412 | −3742.524 | −116.094 | 55.103 | 362.536 | 9.050 | −0.416 |
| A20 | −1410.521 | 635.856 | 1220.130 | 26.190 | −14.063 | −73.520 | −1.303 | 0.042 |

According to the parameter information provided above, the following data can be derived:

| Sixth Embodiment | |
|---|---|
| f (mm) | 1.81 |
| FNO | 1.18 |
| FOV (degree) | 85.5 |
| TTL (mm) | 2.99 |
| TT/f | 1.062 |
| T12 + T23 + T34 (mm) | 0.425 |
| f2/f4 | 1.85 |
| SL/TTL | 0.966 |
| FFL (mm) | 0.73 |
| R8/R9 | 0.768 |
| R4/f2 | 0.435 |

Seventh Embodiment

Figure 13:
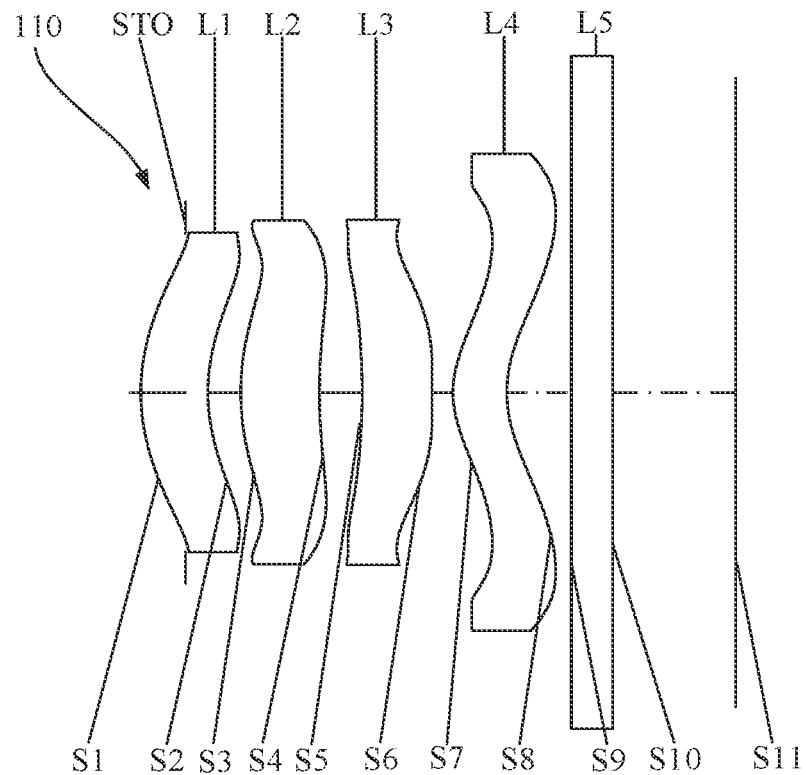
FIG. 13 is a schematic view of an optical lens assembly provided by a seventh embodiment of the present disclosure.
Figure 14:
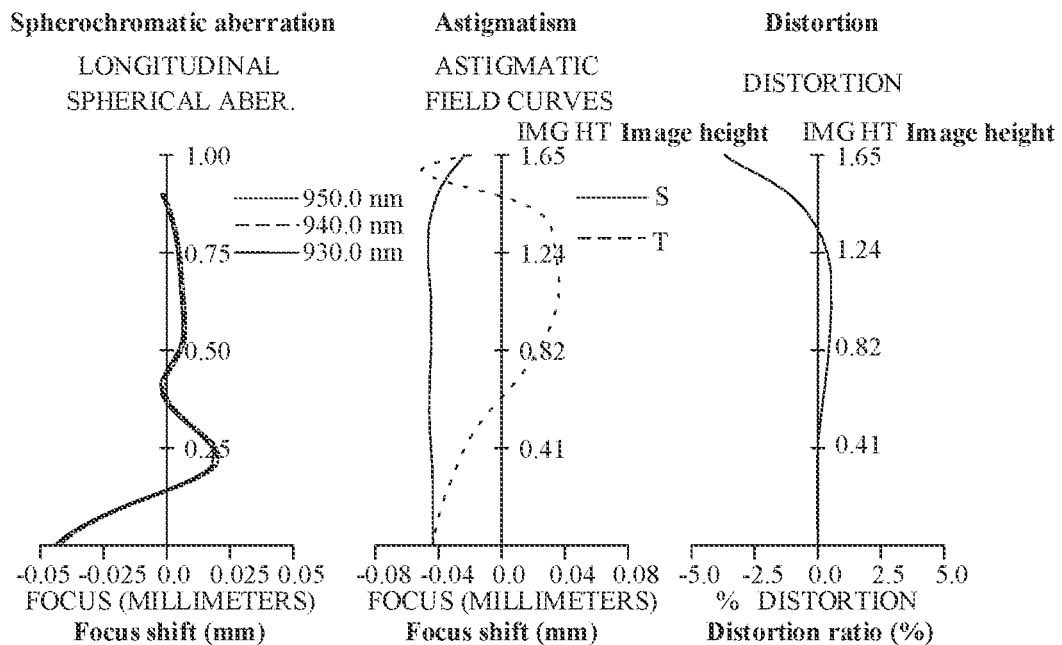
FIG. 14 is a spherochromatic aberration diagram (mm), an astigmatism diagram (mm), and a distortion diagram (%) of the optical lens assembly in the seventh embodiment.

In the seventh embodiment as shown FIG. 13, an optical lens assembly 110 sequentially includes, from an object side to an image side, an optical stop STO, a first lens L1 with a positive refractive power, a second lens L2 with a positive refractive power, a third lens L3 with a negative refractive power, and a fourth lens L4 with a positive refractive power. In addition, an infrared band pass filter L5 is further disposed on the image side of the fourth lens L4. FIG. 14 is a spherochromatic aberration diagram (mm), an astigmatism diagram (mm), and a distortion diagram (%) of the optical lens assembly 110 in the seventh embodiment, where the astigmatism diagram and the distortion diagram are data diagrams at a reference wavelength.

The object side surface S1 of the first lens L1 is convex at the optical axis, the image side surface S2 of the first lens L1 is concave at the optical axis; the object side surface S1 of the first lens L1 is convex at the circumference thereof, and the image side surface S2 of the first lens L1 is convex at the circumference thereof. The object side surface S3 of the second lens L2 is convex at the optical axis, the image side surface S4 of the second lens L2 is concave at the optical axis; the object side surface S3 of the second lens L2 is concave at the circumference thereof, and the image side surface S4 of the second lens L2 is convex at the circumference thereof. The object side surface S5 of the third lens L3 is concave at the optical axis, the image side surface S6 of the third lens L3 is concave at the optical axis; the object side surface S5 of the third lens L3 is concave at the circumference thereof, and the image side surface S6 of the third lens L3 is concave at the circumference thereof. The object side surface S7 of the fourth lens L4 is convex at the optical axis, the image side surface S8 of the fourth lens L4 is concave at the optical axis; the object side surface S7 of the fourth lens L4 is concave at the circumference thereof, and the image side surface S8 of the fourth lens L4 is convex at the circumference thereof.

The object side surfaces and the image side surfaces of the first lens L1, the second lens L2, the third lens L3, and the fourth lens L4 are aspherical surfaces.

The first lens L1, the second lens L2, the third lens L3, and the fourth lens L4 are made of plastic.

In the seventh embodiment, the effective focal length of the optical lens assembly 110 is f=2.05 mm, the f-number FNO=1.15, the maximum field of view FOV=78.7 degrees (deg.), and the distance on the optical axis from the object side surface S1 of the first lens L1 to the imaging plane S11 TTL=3.03 mm.

The various parameters of the optical lens assembly 110 are given in Table 13 and Table 14, and the definition of each parameter can be obtained from the first embodiment, which will not be repeated here.

TABLE 13

Seventh Embodiment
f = 2.05 mm, FNO = 1.15, FOV = 78.7 degree, TTL = 3.03 mm

| Surface number | Surface name | Surface type | Y radius (mm) | Thickness (mm) | Material | Refractive index | Abbe number | Focal length (mm) |
|---|---|---|---|---|---|---|---|---|
| 0 | Object plane | Spherical | Infinite | 742.991 | | | | |
| 1 | Optical stop | Spherical | Infinite | −0.225 | | | | |
| 2 | First lens | Aspherical | 1.137 | 0.341 | Plastic | 1.545 | 55.93 | 62.040 |
| 3 | | Aspherical | 1.054 | 0.167 | | | | |
| 4 | Second lens | Aspherical | 1.361 | 0.401 | Plastic | 1.661 | 20.373 | 3.429 |

TABLE 13-continued

Seventh Embodiment
f = 2.05 mm, FNO = 1.15, FOV = 78.7 degree, TTL = 3.03 mm

| Surface number | Surface name | Surface type | Y radius (mm) | Thickness (mm) | Material | Refractive index | Abbe number | Focal length (mm) |
|---|---|---|---|---|---|---|---|---|
| 5 |  | Aspherical | 3.225 | 0.216 |  |  |  |  |
| 6 | Third lens | Aspherical | −4.529 | 0.357 | Plastic | 1.545 | 55.93 | −5.722 |
| 7 |  | Aspherical | 9.726 | 0.106 |  |  |  |  |
| 8 | Fourth lens | Aspherical | 0.542 | 0.274 | Plastic | 1.661 | 20.373 | 2.136 |
| 9 |  | Aspherical | 0.726 | 0.328 |  |  |  |  |
| 10 | Infrared band pass filter | Spherical | Infinite | 0.210 | Glass | 1.517 | 64.17 |  |
| 11 |  | Spherical | Infinite | 0.626 |  |  |  |  |
| 12 | Imaging plane | Spherical | Infinite | 0.000 |  |  |  |  |

Note:
The reference wavelength is 940 nm

TABLE 14

Seventh Embodiment
Aspheric coefficient

| Surface number | 2 | 3 | 4 | 5 | 6 | 7 | 8 | 9 |
|---|---|---|---|---|---|---|---|---|
| K | −5.062 | −4.853 | −23.514 | −32.209 | −9.516 | 7.353 | −3.741 | −2.233 |
| A4 | 0.118 | 0.433 | 0.872 | 0.013 | −0.216 | −3.390 | −0.491 | 0.085 |
| A6 | 2.308 | −5.433 | −4.618 | 0.248 | 1.968 | 18.872 | 1.904 | −2.934 |
| A8 | −25.193 | 45.347 | 20.331 | −4.939 | −13.813 | −79.699 | −11.919 | 9.667 |
| A10 | 135.900 | −239.565 | −86.694 | 25.259 | 56.810 | 244.727 | 42.554 | −17.548 |
| A12 | −439.081 | 779.100 | 285.209 | −84.712 | −148.626 | −523.155 | −89.293 | 19.722 |
| A14 | 873.090 | −1582.552 | −639.378 | 169.920 | 251.956 | 750.902 | 113.949 | −13.960 |
| A16 | −1046.534 | 1948.013 | 868.180 | −192.549 | −258.096 | −677.032 | −87.031 | 6.021 |
| A18 | 692.573 | −1326.475 | −631.043 | 113.763 | 141.166 | 340.792 | 36.479 | −1.438 |
| A20 | −194.121 | 383.876 | 187.831 | −27.277 | −31.145 | −72.112 | −6.432 | 0.145 |

According to the parameter information provided above, the following data can be derived:

| Seventh Embodiment | |
|---|---|
| f (mm) | 2.05 |
| FNO | 1.15 |
| FOV (degree) | 78.7 |
| TTL (mm) | 3.03 |
| TT/f | 0.908 |
| T12 + T23 + T34 (mm) | 0.489 |
| f2/f4 | 1.61 |
| SL/TTL | 0.924 |
| FFL (mm) | 0.915 |
| R8/R9 | 0.747 |
| R4/f2 | 0.397 |

Figure 15:
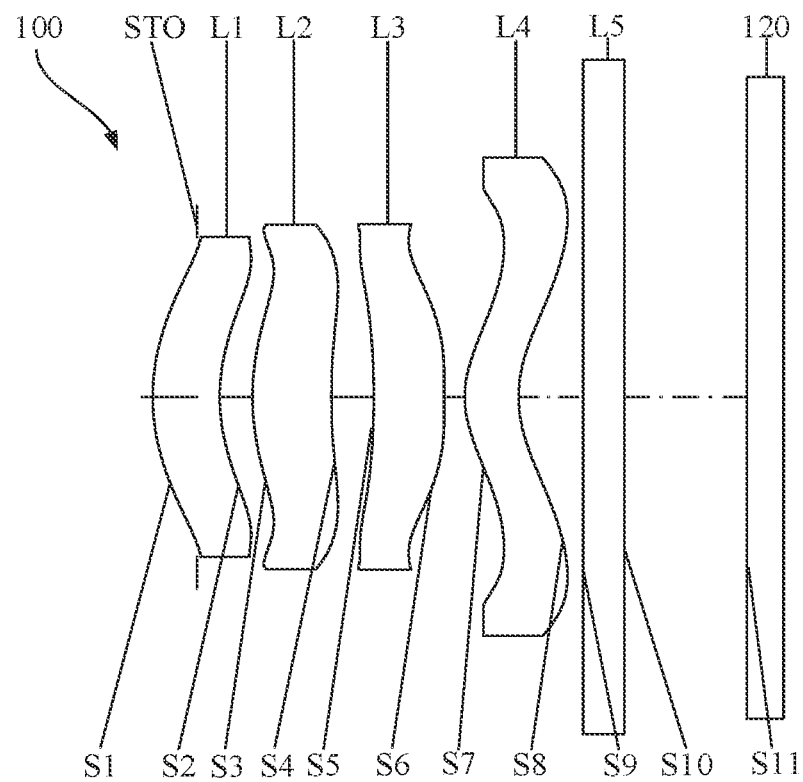
FIG. 15 is a schematic view of an image capturing module provided by an embodiment of the present disclosure.

Referring to FIGS. 13 and 15, the optical lens assembly 110 and the photosensitive element 120 are assembled together to form an image capturing module 100, and the photosensitive element 120 is disposed on the image side of the optical lens assembly 110. The photosensitive element 120 is disposed on the imaging plane S11 of the optical lens assembly 110. The photosensitive element 120 may be a CCD (Charge Coupled Device) or a CMOS (Complementary Metal Oxide Semiconductor).

In some embodiments, the photosensitive element 120 is relatively fixedly disposed at the imaging plane S11 of the optical lens assembly 110, and in this case the image capturing module 100 is a fixed focus module.

In some other embodiments, a voice coil motor is arranged on the photosensitive element 120 to enable the photosensitive element 120 to relatively move relative to the lens in the optical lens assembly 110. Alternatively, a fixing member can also be disposed to relatively fix the optical stop STO, the first lens L1, the second lens L2, the third lens L3, and the fourth lens L4, and in addition, a voice coil motor is arranged on the fixing member to drive the above lens and the optical stop STO to move relative to the photosensitive element 120, so that the image capturing module 100 has a focusing function.

The image capturing module 100 can meet the needs of electronic devices for optical recognition functions, such as face unlocking on mobile phones, automatic drive on cars, human-machine interfaces and games, industrial machine vision and measurement, security monitoring, and the like.

Figure 16:
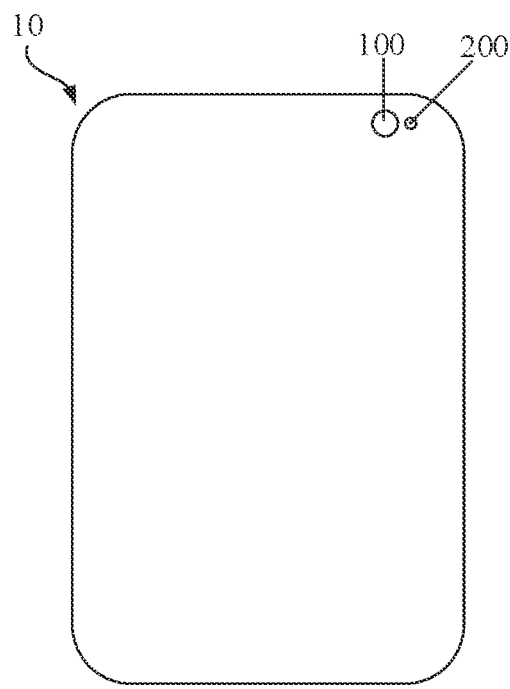
FIG. 16 is a schematic view of a mobile terminal provided by an embodiment of the present disclosure.

Referring to FIG. 16, when the recognition function is implemented, the image capturing module 100 also needs the cooperation with an emitting module 200. In some embodiments, the image capturing module 100 and the emitting module 200 are assembled together to form a recognition device. The emitting module 200 emits modulated infrared light to the measured object. The infrared light can be continuous light or pulsed light. After the modulated light reaches the surface of the measured object, the modulated light is reflected and carries the depth information of the surface of the measured object to form information light. The image capturing module 100 can receive the information light reflected by the measured object. Specifically, the modulated light emitted by the emitting module 200 may be 3D (three dimensional) structured light or modulated pulsed light in TOF technology. The infrared band pass filter in the image capturing module 100 can allow the infrared light at a specific wavelength band emitted by the emitting module 200 to pass through, while filtering out light at other wavelength bands to prevent interference light from being received by the photosensitive element, and thus the image capturing module 100 can perfectly cooperate with the emitting module 200.

The recognition device can be applied to a mobile terminal 10, the mobile terminal 10 may be a smart phone, a smart watch, a tablet computer, a personal digital assistant, a game console, a PC (Personal Computer), and other devices. By adopting the optical lens assembly of the present disclosure, the mobile terminal 10 can be designed to be thinner and smaller.

The "electronic devices" used in the embodiments of the present disclosure may include, but are not limited to, devices that are configured to be connected via a wired line (such as via a public switched telephone network (PSTN), a digital subscriber line (DSL), a digital cable, a direct cable connection, and/or another data connection/network), and/or receive/transmit communication signals via a wireless interface (for example, for a cellular network, a wireless local area network (WLAN), a digital television network such as a digital video broadcasting handheld (DVB-H) network, a satellite network, an amplitude modulation-frequency modulation (AM-FM) broadcast transmitter, and/or another communication terminal). Electronic devices configured to communicate through a wireless interface may be referred to as "wireless communication terminals", "wireless terminals", and/or "mobile terminals". Examples of the mobile terminal include, but are not limited to, a satellite or cellular phone; a personal communication system (PCS) terminal that can combine a cellular radio telephone with data processing, fax, and data communication capabilities; a personal digital assistant (PDA) that can include a radio telephone, a pager, an Internet/Intranet access, a Web browser, a notepad, a calendar, and/or a global positioning system (GPS) receiver; and a conventional laptop and/or handheld receiver or other electronic device including a radio telephone transceiver.

In the description of the present disclosure, it should be understood that orientation or positional relationship indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", and the like are the orientation or positional relationship shown based on the drawings, which are only to facilitate the description of the present disclosure and simplify the description, rather than indicating or implying the device or elements referred to must have a specific orientation or be constructed and operated in a specific orientation, therefore they cannot be construed as limiting the present disclosure.

In addition, the terms "first" and "second" are used for purposes of description only, and cannot be understood to indicate or imply relative importance or implicitly indicate the number of technical features indicated. Therefore, the features defined "first" and "second" may explicitly or implicitly include at least one of the features. In the description of the present disclosure, the meaning of "plurality" is at least two, such as two, three, or more, unless otherwise clearly and specifically defined.

In the present disclosure, unless otherwise clearly specified and limited, the terms "installed", "connected with each other", "connected", "fixed" and other terms should be understood in a broad sense, for example, it may be fixedly connected or detachably connected, or integrated as one; it may be mechanically connected or electrically connected; it may be directly connected, or may be indirectly connected through an intermediate, it may be the communication between two components or the interaction between two components, unless otherwise clearly defined. Those of ordinary skill in the art can understand the specific meanings of the above terms in the present disclosure according to specific situations.

In the present disclosure, unless otherwise clearly specified and defined, a first feature is "on" or "below" a second feature may be that the first and second features are in direct contact, or the first and second features are indirectly contact through an intermediate. The first feature is "at the top of", "above", and "over" the second feature may indicate that the first feature is directly or obliquely above the second feature, or only indicate that a level height of the first feature is higher than that of the second feature. The first feature is "at the bottom of", "below", and "under" the second feature may be that the first feature is directly or obliquely below the second feature, or only indicate that the level height of the first feature is less than that of the second feature.

In the descriptions of this specification, the descriptions with reference to the terms "an embodiment", "some embodiments", "example", "specific example", or "some examples", or the like means that the specific features, structures, materials or characteristics described with reference to the embodiments or examples are included in at least one embodiment or example of the present disclosure. In this specification, the schematic representations of the above terms do not necessarily refer to a same embodiment or example. Moreover, the described specific features, structures, materials or characteristics can be combined in an appropriate manner in any one or more embodiments or examples. In addition, those skilled in the art can combine and assemble the different embodiments or examples and the features of the different embodiments or examples described in this specification without contradicting each other.

The technical features of the above described embodiments can be combined arbitrarily. To simplify the description, not all possible combinations of the technical features in the above embodiments are described. However, all of the combinations of these technical features should be considered as within the scope of the present disclosure, as long as such combinations do not contradict with each other.

The above described embodiments are merely illustrate several embodiments of the present disclosure, which are described more specifically and in detail, but they cannot be understood as limiting the scope of the present disclosure. It should be noted that, for those ordinary skilled in the art, several variations and improvements may be made without departing from the concept of the present disclosure, and all of which are within the protection scope of the present disclosure. Therefore, the protection scope of the present disclosure shall be defined by the appended claims.

What is claimed is:

1. An optical lens assembly, sequentially arranged from an object side to an image side, comprising:
   a first lens with a refractive power;
   a second lens with a positive refractive power, an object side surface of the second lens being concave at a circumference thereof, and an image side surface of the second lens being convex at a circumference thereof;

a third lens with a refractive power;

a fourth lens with a positive refractive power, an image side surface of the fourth lens being concave at an optical axis, an object side surface and the image side surface of the fourth lens being aspherical, and at least one of the object side surface and the image side surface of the fourth lens having an inflection point;

wherein, the optical lens assembly satisfies the following relationship:

$$TT/f<1.3;$$

wherein, TT is a distance on the optical axis from an object side surface of the first lens to the image side surface of the fourth lens, and f is an effective focal length of the optical lens assembly;

$$1.0<f2/f4<2.5;$$

wherein, f2 is a focal length of the second lens, and f4 is a focal length of the fourth lens.

2. The optical lens assembly according to claim 1, wherein the optical lens assembly satisfies the following relationship:

$$0.35\ mm<T12+T23+T34<0.85\ mm;$$

wherein, T12 is an air gap on the optical axis between the first lens and the second lens, T23 is an air gap on the optical axis between the second lens and the third lens, and T34 is an air gap on the optical axis between the third lens and the fourth lens.

3. The optical lens assembly according to claim 1, wherein the optical lens assembly satisfies the following relationship:

$$FNO \leq 1.3;$$

wherein, FNO is a f-number of the optical lens assembly.

4. The optical lens assembly according to claim 1, further comprising an optical stop, wherein the optical stop is arranged at an object side of the first lens, and the optical lens assembly satisfies the following relationship:

$$0.8<SL/TTL<1.1;$$

wherein, SL is a distance on the optical axis from the optical stop to an imaging plane of the optical lens assembly, and TTL is a distance on the optical axis from an object side surface of the first lens to the imaging plane of the optical lens assembly.

5. The optical lens assembly according to claim 1, further comprising an optical stop, wherein the optical stop is disposed between the first lens and the fourth lens, and the optical lens assembly satisfies the following relationship:

$$0.8<SL/TTL<1.1;$$

wherein, SL is a distance on the optical axis from the optical stop to an imaging plane of the optical lens assembly, and TTL is a distance on the optical axis from an object side surface of the first lens to the imaging plane of the optical lens assembly.

6. The optical lens assembly according to claim 1, wherein the optical lens assembly satisfies the following relationship:

$$FFL>0.7\ mm;$$

wherein, FFL is a closest distance from the image side surface of the fourth lens to an imaging plane of the optical lens assembly in a direction of the optical axis.

7. The optical lens assembly according to claim 1, wherein the optical lens assembly satisfies the following relationship:

$$R8/R9<1.0;$$

wherein, R8 is a radius of curvature of the object side surface of the fourth lens at a paraxial position, and R9 is a radius of curvature of the image side surface of the fourth lens at a paraxial position.

8. The optical lens assembly according to claim 1, wherein the optical lens assembly satisfies the following relationship:

$$0.2<R4/f2<0.6;$$

wherein, R4 is a radius of curvature of the object side surface of the second lens at a paraxial position, and f2 is a focal length of the second lens.

9. The optical lens assembly according to claim 1, wherein the optical lens assembly satisfies the following relationship:

$$TT/f \leq 1.10.$$

10. The optical lens assembly according to claim 1, wherein the first lens and the third lens each have a positive refractive power.

11. The optical lens assembly according to claim 1, wherein the first lens and the third lens each have a negative refractive power.

12. The optical lens assembly according to claim 1, wherein the first lens has a positive refractive power, and the third lens has a negative refractive power.

13. The optical lens assembly according to claim 1, wherein an object side surface of the first lens is convex at the optical axis, and an image side surface of the first lens is concave at the optical axis.

14. The optical lens assembly according to claim 1, wherein the object side surface of the second lens is convex at the optical axis, and the image side surface of the second lens is concave at the optical axis.

15. The optical lens assembly according to claim 1, wherein the object side surface of the fourth lens is convex at the optical axis.

16. The optical lens assembly according to claim 1, wherein the first lens, the second lens, the third lens, and the fourth lens are made of plastic.

17. An image capturing module, comprising a photosensitive element and the optical lens assembly according to any one of claim 1, wherein the photosensitive element is disposed on an image side of the optical lens assembly.

18. The image capturing module according to claim 17, further comprising an infrared band pass filter, wherein the infrared band pass filter is disposed between the fourth lens and the photosensitive element.

19. A mobile terminal, comprising an emitting module and the image capturing module according to claim 18, wherein the emitting module is capable of emitting modulated light to a measured object, the modulated light is reflected on a surface of the measured object to form an information light carrying information of the surface of the measured object, and the image capturing module is capable of receiving the information light reflected from the measured object.

* * * * *